US012668735B1

(12) United States Patent
    Sakthivel et al.

(10) Patent No.: US 12,668,735 B1
(45) Date of Patent: Jun. 30, 2026

(54) IMIDAZOLIUM BASED IONIC LIQUID FOR ENHANCED OIL RECOVERY APPLICATIONS

(71) Applicant: King Fahd University of Petroleum and Minerals, Dhahran (SA)

(72) Inventors: Sivabalan Sakthivel, Dhahran (SA); Safwat Sayed Abdel-Azeim Abdellatif, Dhahran (SA); Athaa Alotaibi, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 19/394,723

(22) Filed: Nov. 19, 2025

(51) Int. Cl.
    *E21B 43/34* (2006.01)
    *C09K 8/58* (2006.01)

(52) U.S. Cl.
    CPC ..................................... *C09K 8/58* (2013.01)

(58) Field of Classification Search
    CPC ............ C09K 8/58; E21B 43/34; E21B 33/13
    USPC ...................................................... 166/275
    See application file for complete search history.

(56)                      References Cited

U.S. PATENT DOCUMENTS

2005/0224230 A1*  10/2005  Cobb ...................... E21B 43/16
                                                      166/305.1
2010/0331222 A1*  12/2010  Braun ...................... C09K 8/80
                                                      536/56
2014/0042058 A1*  2/2014  Janssen ................... C09K 8/58
                                                      208/188

2024/0059958 A1*  2/2024  Cavazos Sepulveda ...................
                                                      E21B 43/16

FOREIGN PATENT DOCUMENTS

IN            324764 B        8/2019

OTHER PUBLICATIONS

Noran Mousa, et al., "Potential of Imidazolium-Based Ionic Liquids for Sustainable Enhancement of Oil Recovery in Emirati Tight Reservoirs", ACS Omega, vol. 10, Issue 29, Jul. 16, 2025, pp. 32122-32134.
Y. Muhammad Shafiq, et al., "Effects of carbon chain length of imidazolium-based ionic liquid in the interactions between heavy crude oil and sand particles for enhanced oil recovery", Journal of Molecular Liquids, vol. 274, Oct. 28, 2018, pp. 285-292, Excerpts only, 7 pages, and accepted manuscript, 21 pages.
Iago Rodríguez-Palmeiro, et al., "Characterization and interfacial properties of the surfactant ionic liquid 1-dodecyl-3-methyl imidazolium acetate for enhanced oil recovery", RSC Advances 2015, vol. 5, Issue 47, Apr. 16, 2015, pp. 37392-37398.

* cited by examiner

*Primary Examiner* — William D Hutton, Jr.
*Assistant Examiner* — Ashish K Varma
(74) *Attorney, Agent, or Firm* — Oblon, McClelland, Maier & Neustadt, L.L.P.

(57)                      ABSTRACT

Treating an underground geological formation with an imidazolium based ionic liquid will enhance oil recovery in oil reservoirs with carbonated rock. The treatment is suitable for oil recovery at harsh conditions with elevated temperature and high salinity.

20 Claims, 12 Drawing Sheets

50

Inject a solution comprising an imidazolium based ionic liquid and an aqueous liquid to an underground geological formation including crude oil and carbonate rock — 52

Flood a portion of the underground geological formation with the solution at a temperature of 80 to 150 under a pressure of 1500 to 3000 psi to displace the crude oil and from the carbonate rock — 54

Extract the crude oil from the underground geological formation — 56

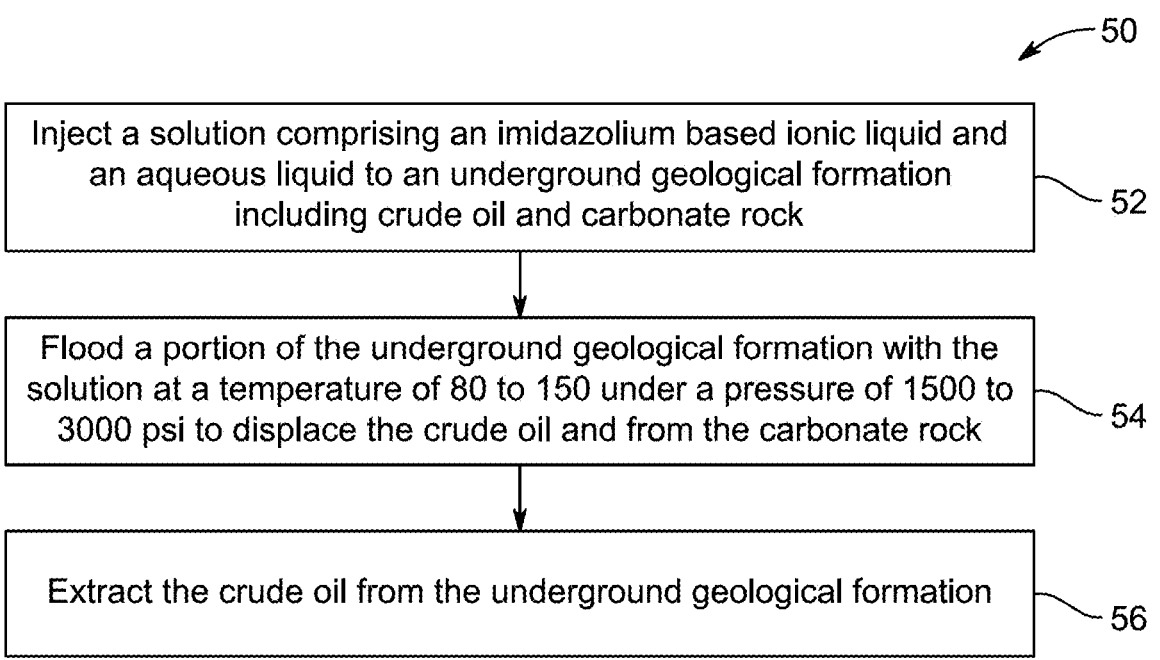

~50

Inject a solution comprising an imidazolium based ionic liquid and an aqueous liquid to an underground geological formation including crude oil and carbonate rock — 52

Flood a portion of the underground geological formation with the solution at a temperature of 80 to 150 under a pressure of 1500 to 3000 psi to displace the crude oil and from the carbonate rock — 54

Extract the crude oil from the underground geological formation — 56

FIG. 1

1-dodecyl-3-(Carboxymethyl)-imidazolium bromide 1-dodecyl-3-ethyl-imidazolium bromide

IMIDAZOLIUM BASED IONIC LIQUID FOR ENHANCED OIL RECOVERY APPLICATIONS

STATEMENT REGARDING PRIOR DISCLOSURE BY AN INVENTOR

Aspects of the present disclosure are described in Sakthivel S., et al. "Functionalization of Imidazolium-Based Ionic Liquids for the Improved Oil Recovery from Carbonate Reservoirs under Harsh Conditions" published in Issue 18, Volume 39, *Energy & Fuels* (2025), which is incorporated herein by reference in its entirety.

STATEMENT OF ACKNOWLEDGEMENT

Support provided by the King Fahd University of Petroleum and Minerals (KFUPM), Saudi Arabia is gratefully acknowledged.

BACKGROUND

Technical Field

The present disclosure is directed to an oil recovery technique and, more particularly, towards recovering oil from a subterranean geological formation using an imidazolium based ionic liquid.

Description of Related Art

The "background" description provided herein is for the purpose of generally presenting the context of the disclosure. The work of the presently named inventors, to the extent it is described in this background section, as well as aspects of the description which may not otherwise qualify as prior art at the time of filing, are neither expressly nor impliedly admitted as prior art against the present invention.

Almost two-thirds of the world's oil and gas reservoirs are identified to be carbonate formations, and there is a significant fraction of oil reservoirs remaining unrecoverable or untapped even after primary and secondary (water) floodings. The carbonate reservoirs are known for complexity, natural fractures, low permeabilities, and high heterogeneity. In addition, the majority of these carbonate formations are also oil-wet. In such reservoirs, the usual injection fluids tend to fail with insignificant recovery due to high capillary pressure differences between the pores and the fractures and fail to access pores within the source rock. The chemically enhanced oil recovery (cEOR) is a promising technology for improving oil displacements in the depleted reservoirs. The injected chemicals tend to alter the physicochemical interactions existing in the reservoirs, specifically at the rock-oil-water and oil-water interfaces. This process modifies the interfacial properties including interfacial tension (IFT), wettability, capillarity and relative permeability, facilitates the mobility of the residual oil and improves the oil recovery. However, traditional chemicals, such as polymers, surfactants, macromolecules, biomolecules, alkalis, and co-solvents, face numerous challenges in complex formations. Most of these chemicals also face stability issues in the harsh reservoir conditions, where temperature exceeds 150° C. and salinity is around 240 kppm. In those conditions, the traditional chemicals tend to degrade or precipitate, losing efficiency and, in some cases, damaging the formation by precipitation, causing the reservoir plugging. However, despite the fact that the stability of the chemicals depends on various factors including but not limited to pH, rock type, rock mineral composition and oil composition, the elevated temperature and salinity contribute more to the fluid flow in the porous media.

Several specialized chemicals have been developed to withstand high temperature and high salinity and have been tested for oil field applications including oil displacements. Examples include gemini surfactants, functionalized nano-materials and engineered smart water, which have been formulated and investigated in the oil-wet reservoirs. These studies aimed to attain the prerequisite wettability in the reservoir by altering the physicochemical interactions within the reservoirs, thereby improving oil displacements and overall oil recovery. The surface of the carbonate reservoirs is characterized by positive charges, and long-term aging and/or maturation process will shift the reservoirs towards being oil wet. This occurs when the negatively charged oil adsorbs onto the positively charged rock surface, where the oil contains carboxylate —$COO^-$ group and the other heteroatoms such as resins and asphaltenes. In such cases, using cationic surfactants would be effective to induce electrostatic interaction. The positively charged head group of the cationic surfactants interacts with the negatively charged oil adsorbed on the rock surface, while the hydrophobic contents of both the oil and the surfactant experience hydrophobic interactions, stabilizing the ion pair interactions. As a result, the oil can be desorbed from the rock surface with surfactant flooding (mainly cationic surfactants), and the desorbed oil can be mobilized improving the oil recovery significantly. Nanofluids tend to accumulate at the rock-oil-water interface, creating the wedge formation and increasing the capillary pressure of the nanofluids by inducing structural disjoining pressure gradients. Altering the ionic composition of the engineered smart water in the injection water or brine would make the system more effective in altering the reservoirs wettability, where the ionic composition is alter by adding or removing one or more specific ions, especially the potential determining ions such as $Ca^{2+}$, $Mg^{2+}$, and $SO_4^{2-}$. The engineered water changes electrical double-layer thickness existing on the rock surface and the chemical equilibrium in the rock-oil-water system, leading to wettability modifications and the increase of the oil recovery.

However, specialized chemicals often exhibit poor deliverability in deep or low-permeability reservoirs, such as the Ghawar field in Saudi Arabia, due to limited pore-network connectivity. In large fields where injector and producer wells are spaced at least 1 km apart, traditional CEOR methods fail to achieve sufficient penetration. Loss of surfactants and polymers due to adsorption and diffusion within the porous media severely limits their reach beyond the near-wellbore region. The formulation requires high concentrations of these chemicals, which often exceeds 1 wt %, making large-scale field applications uneconomical.

Accordingly, the object of the present disclosure is to provide a method for enhanced oil recovery (EOR) in carbonate reservoirs under elevated temperature and salinity conditions. Another object of the present disclosure is to develop functionalized ionic liquids that are thermally and chemically stable and capable of altering the physicochemical interactions at the rock-oil-water interfaces. Yet another object of the present disclosure is to provide imidazolium-based ionic liquids with tailored head-group functionalities that enable improved micelle formation, interfacial activity, and deep-reservoir deliverability, thereby enhancing oil displacement efficiency. A further object of the present disclosure is to provide a method that effectively reduces interfacial tension (IFT) and modifies wettability of the reservoir rock from oil-wet to water-wet, thereby facilitating improved mobility of residual oil. Another object of the present disclosure is to demonstrate that the developed ILs can be used at a concentration of 0.01-10 mM compared to conventional surfactants, thus improving the economic feasibility of field-scale applications.

SUMMARY

In an exemplary embodiment, a method of enhanced oil recovery is described. The method includes injecting a solution including an imidazolium based ionic liquid and an aqueous liquid to an underground geological formation comprising crude oil and carbonate rock, where the imidazolium based ionic liquid is selected from the group consisting of 1-dodecyl-3-ethyl-imidazolium bromide and 1-dodecyl-3-(carboxymethyl)-imidazolium bromide. The aqueous liquid is at least one selected from a group consisting of water, a saline solution having a salinity of 1 to 300 kppm and a seawater having a salinity of 20 to 50 kppm. The method further includes flooding a portion of the underground geological formation with the solution at a temperature of 80 to 150° C. under a pressure of 1500 to 3000 psi to displace the crude oil from the carbonate rock, and extracting the crude oil from the underground geological formation.

In some embodiments, 1-dodecyl-3-(carboxymethyl)-imidazolium bromide is obtained by a process including reacting bromoacetic acid with n-dodecyl imidazole at an elevated temperature to form 1-dodecyl-3-(carboxymethyl)-imidazolium bromide in the form of powder.

In some embodiments, 1-dodecyl-3-ethyl-imidazolium bromide is obtained by a process including reacting 1-bromoethane with n-dodecyl imidazole at an elevated temperature to form 1-dodecyl-3-ethyl-imidazolium bromide in the form of powder.

In some embodiments, the imidazolium based ionic liquid is thermally stable, having a weight loss of 1 to 5 wt. % at a temperature of 180 to 200° C. based on the total weight of the imidazolium based ionic liquid.

In some embodiments, the imidazolium based ionic liquid has a decomposition temperature of 250 to 300° C.

In some embodiments, the imidazolium based ionic liquid contains 1-dodecyl-3-ethyl-imidazolium bromide, and 1-dodecyl-3-ethyl-imidazolium bromide has a critical micelle concentration of 10 to 15 mM.

In some embodiments, the imidazolium based ionic liquid contains 1-dodecyl-3-(carboxymethyl)-imidazolium bromide, and -dodecyl-3-(carboxymethyl)-imidazolium bromide has a critical micelle concentration of 1 to 5 mM.

In some embodiments, the solution comprises 1-dodecyl-3-ethyl-imidazolium bromide above critical micelle concentration and water, and the solution exhibits an air-water interfacial surface tension on the carbonate rock at a pressure of 10 to 30 psi of 30 to 40 mN/m at an ambient temperature and 1 to 6 mN/m at a temperature of 50 to 70° C.

In some embodiments, the solution comprises 1-dodecyl-3-(carboxymethyl)-imidazolium bromide above critical micelle concentration and water, and the solution exhibits an air-water interfacial surface tension on the carbonate rock at a pressure of 10 to 30 psi of 25 to 40 mN/m at an ambient temperature and 1 to 6 mN/m at a temperature of 50 to 70° C.

In some embodiments, the solution comprises 1-dodecyl-3-ethyl-imidazolium bromide above critical micelle concentration and seawater, and the solution exhibits an oil-seawater interfacial surface tension on the carbonated rock of 1 to 5 mN/m at an ambient temperature.

In some embodiments, the solution comprises 1-dodecyl-3-(carboxymethyl)-imidazolium bromide above critical micelle concentration and seawater, and the solution exhibits an oil-seawater interfacial surface tension of 0.1 to 5 mN/m at an ambient temperature.

In some embodiments, the solution comprises 1-dodecyl-3-ethyl-imidazolium bromide at a concentration of 45 to 55 mM and seawater, and a carbonate rock aged with the solution under ambient conditions for 30 to 40 days exhibits a rock-oil-seawater contact angle of 72° to 76° at a temperature of 20 to 50° C. and a pressure of 1500 to 3000 psi.

In some embodiments, the carbonate rock exhibits a rock-oil-seawater contact angle of 68° to 72° at a temperature of 70 to 100° C. and a pressure of 1500 to 3000 psi.

In some embodiments, the solution comprises 1-dodecyl-3-(carboxymethyl)-imidazolium bromide at a concentration of 45 to 55 mM and seawater, and a carbonated rock aged with the solution under ambient conditions for 30 to 40 days exhibits a contact angle between the carbonate rock, crude oil and seawater of 48° to 52° at a temperature of 20 to 50° C. and a pressure of 1500 to 3000 psi.

In some embodiments, the carbonate rock exhibits a contact angle between the carbonate rock, crude oil and seawater of 44° to 48° at a temperature of 70 to 100° C. and a pressure of 1500 to 3000 psi.

In some embodiments, the solution comprises 1-dodecyl-3-ethyl-imidazolium bromide at a concentration of 0.1 to 0.3 mM and seawater, and an equilibrium oil-seawater interfacial surface tension is reached after 8 to 12 hours after contacting at a value of 12 to 17 mN/m.

In some embodiments, the solution comprises 1-dodecyl-3-(carboxymethyl)-imidazolium bromide at a concentration of 0.1 to 0.2 mM and seawater, and an equilibrium between the carbonated rock, crude oil and seawater on the interfacial surface tension is reached after 2 to 4 hours at a value of 10 to 12 mN/m.

In some embodiments, the solution comprises 1-dodecyl-3-(carboxymethyl)-imidazolium bromide at a concentration of 0.2 to 0.3 mM and seawater, and an equilibrium between the carbonated rock, crude oil and seawater on the interfacial surface tension is reached after 0.5 to 2 hours at a value of 5 to 7 mN/m.

In some embodiments, a cumulative oil recovery rate of 50% to 65% after a duration of 900 to 1200 hours, where the imidazolium based ionic liquid is at a concentration of 5 to 10 mM.

In some embodiments, the method has an oil recovery rate of 60 to 80% after a duration of 900 to 1200 hours, wherein the imidazolium based ionic liquid is at a concentration of 40 to 60 mM.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 1 is a flowchart illustrating a method of enhanced oil recovery, according to certain embodiments.

Figures 2A, 2B:
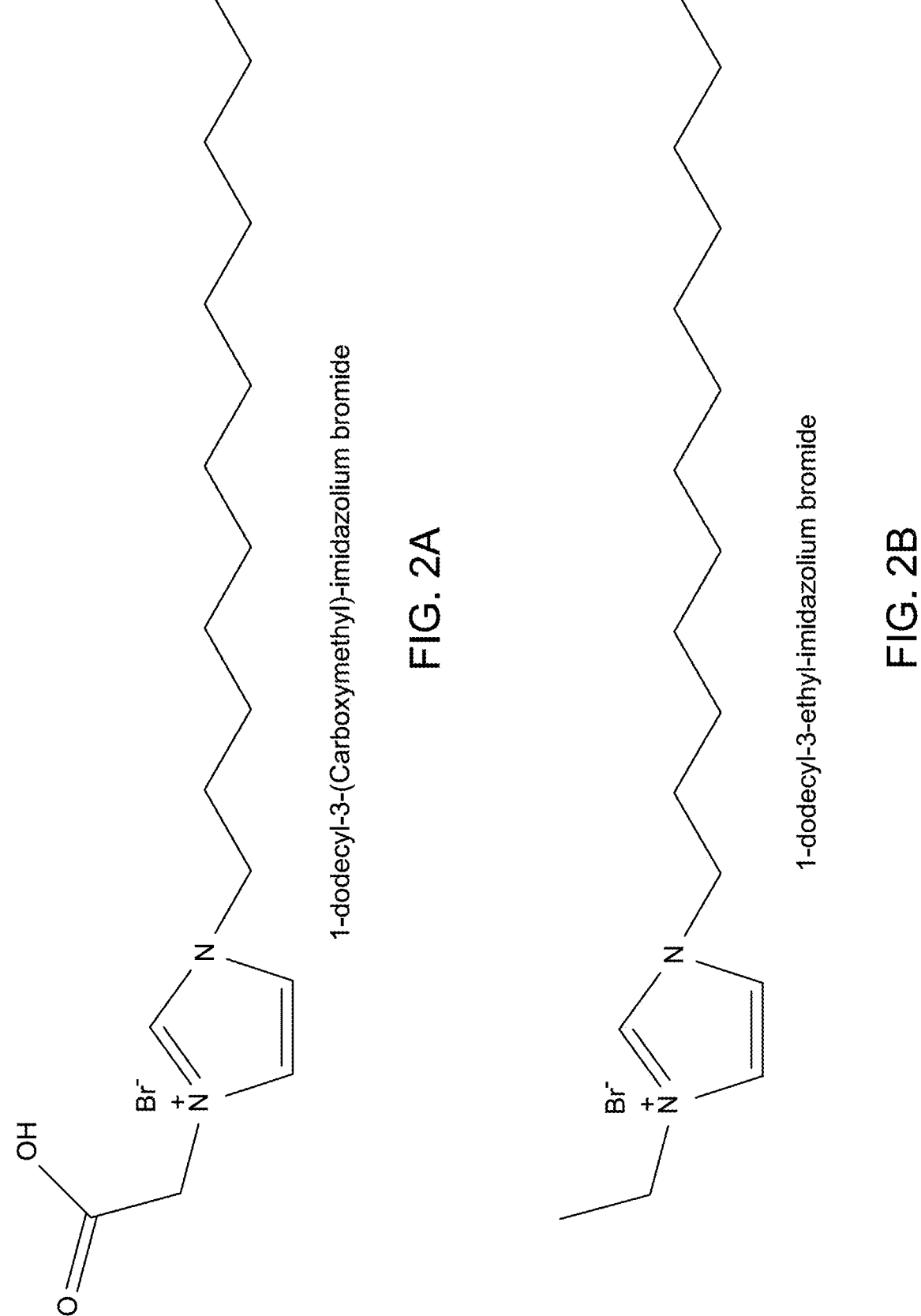

FIG. 2A is a scheme showing the chemical structure of 1-dodecyl-3-(carboxymethyl)-imidazolium bromide $[C_{12}C_1COOHim]^+[Br]^-$, according to certain embodiments.

FIG. 2B is a scheme showing the chemical structure of 1-dodecyl-3-ethyl-imidazolium bromide $[C_{12}C_2im]^+[Br]^-$, according to certain embodiments.

Figure 3:
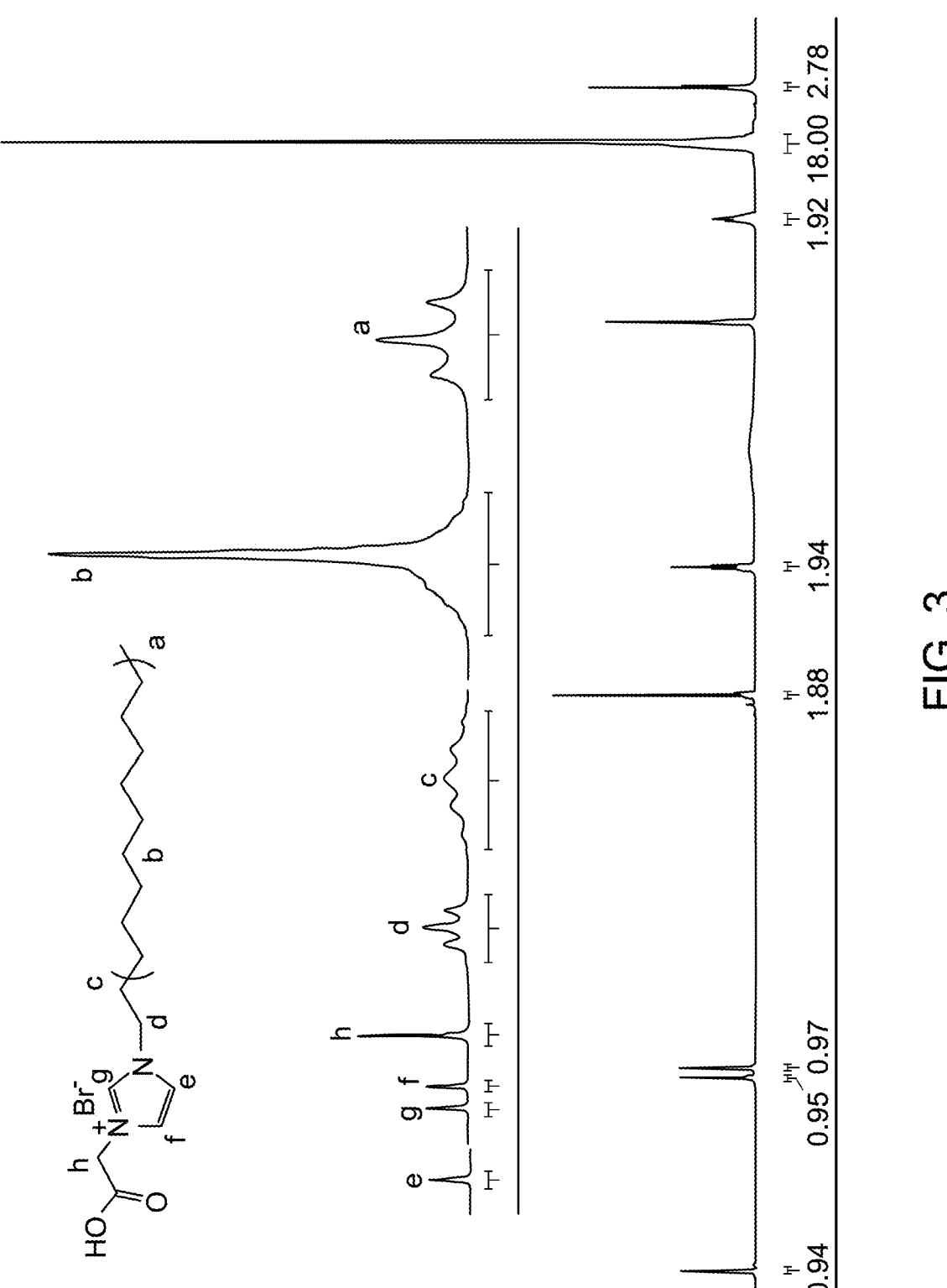

FIG. 3 shows a proton nuclear magnetic resonance ($^1$H-NMR) spectrum of 1-dodecyl-3-(carboxymethyl)-imidazolium bromide $[C_{12}C_1COOHim]^+[Br]^-$, according to certain embodiments.

Figure 4:
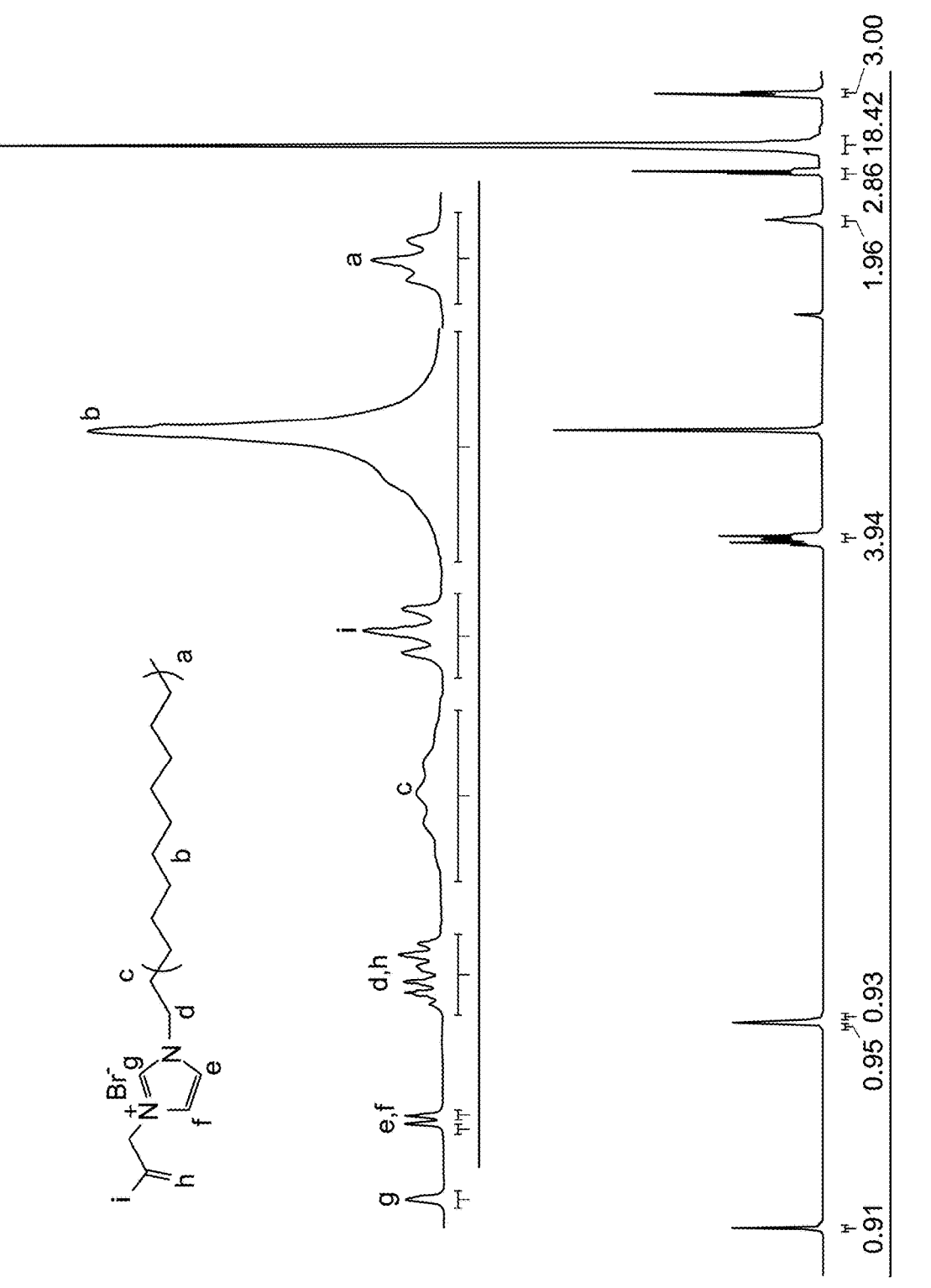

FIG. 4 shows a $^1$H-NMR spectrum of 1-dodecyl-3-ethyl-imidazolium bromide $[C_{12}C_2im]^+[Br]^-$, according to certain embodiments.

Figure 5A:
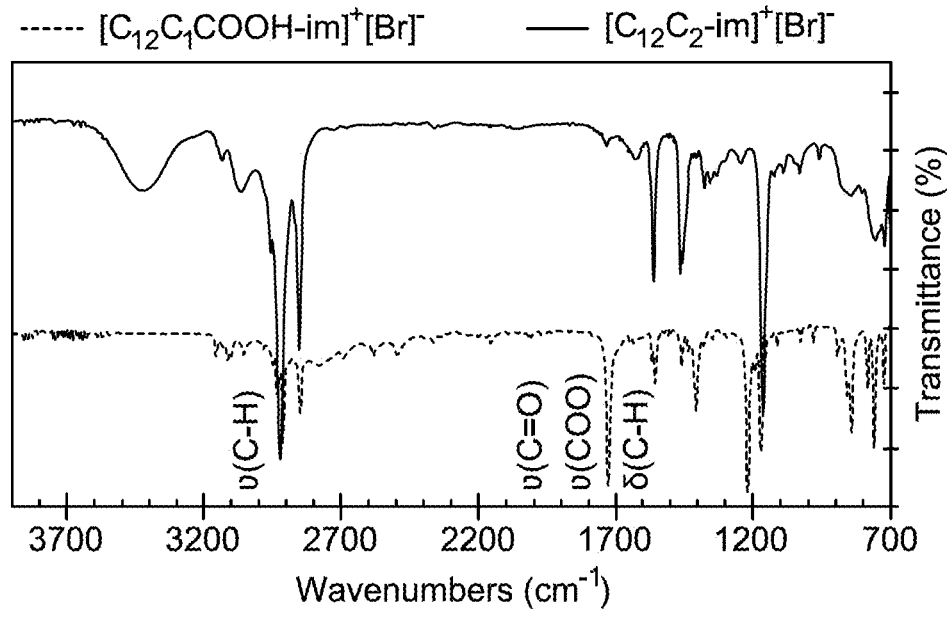

FIG. 5A shows Fourier Transform Infrared (FT-IR) spectra of 1-dodecyl-3-(carboxymethyl)-imidazolium bromide $[C_{12}CCOOHim]^+[Br]^-$ and 1-dodecyl-3-ethyl-imidazolium bromide $[C_{12}C_2im]^+[Br]^-$, according to certain embodiments.

Figure 5B:
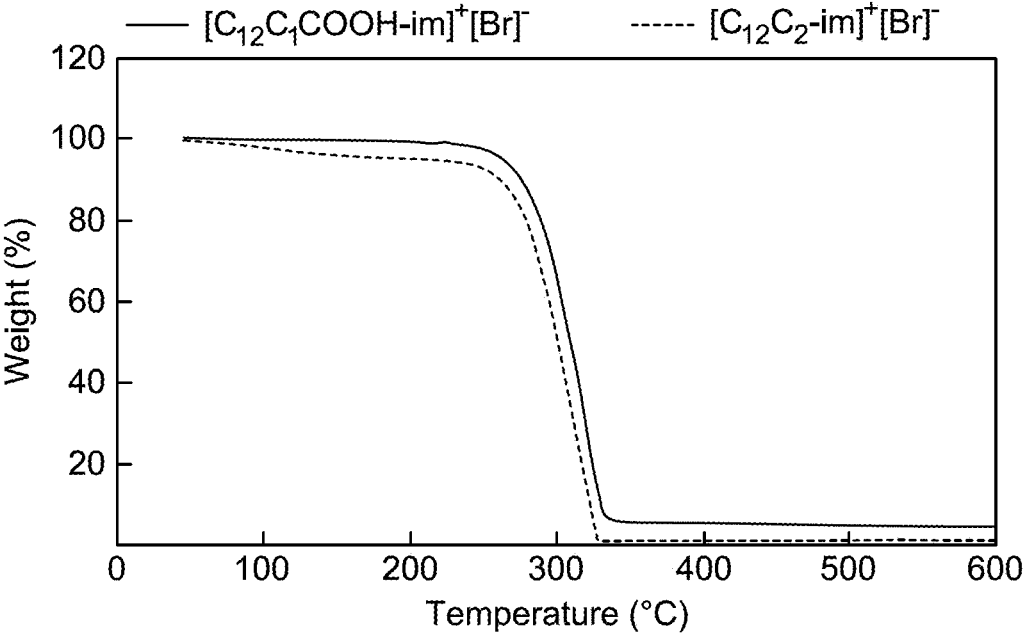

FIG. 5B shows thermogravimetric analysis (TGA) plots of 1-dodecyl-3-(carboxymethyl)-imidazolium bromide $[C_{12}CCOOHim]^+[Br]^-$ and 1-dodecyl-3-ethyl-imidazolium bromide $[C_{12}C_2im]^+[Br]^-$, according to certain embodiments.

Figure 6:
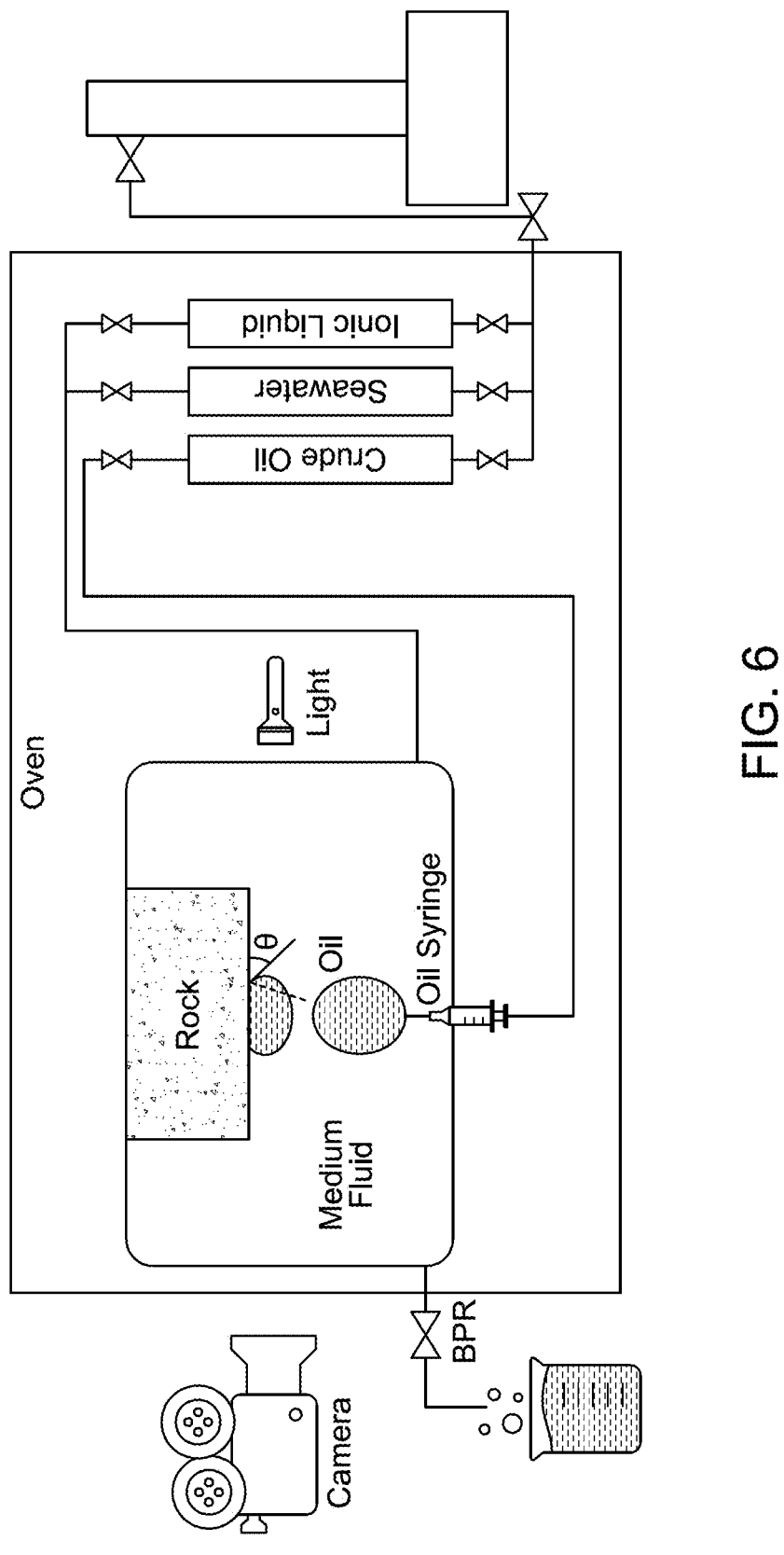

FIG. 6 is a schematic illustration of a high temperature high pressure (HTHP) tensiometer, according to certain embodiments.

Figure 7A:
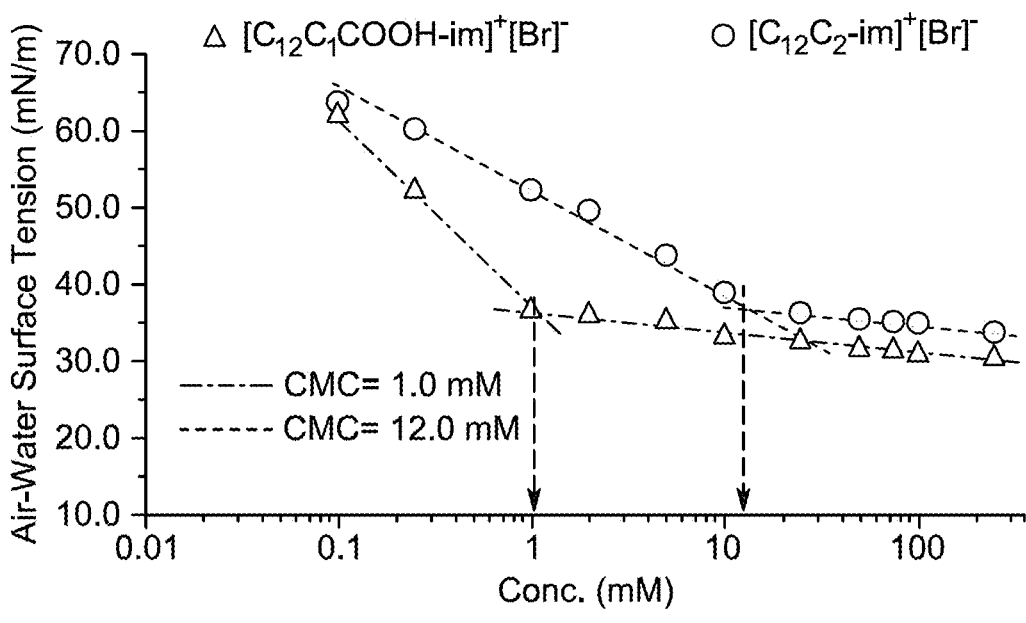

FIG. 7A shows the relationship of the air-water surface tension of 1-dodecyl-3-(carboxymethyl)-imidazolium bromide $[C_{12}CCOOHim]^+[Br]^-$ or 1-dodecyl-3-ethyl-imidazolium bromide $[C_{12}C_2im]^+[Br]^-$ with the concentration ranging from 0.01 to 400 mM under an ambient condition, where the temperature is 25° C. and the pressure is 14.7 psi, according to certain embodiments.

Figure 7B:
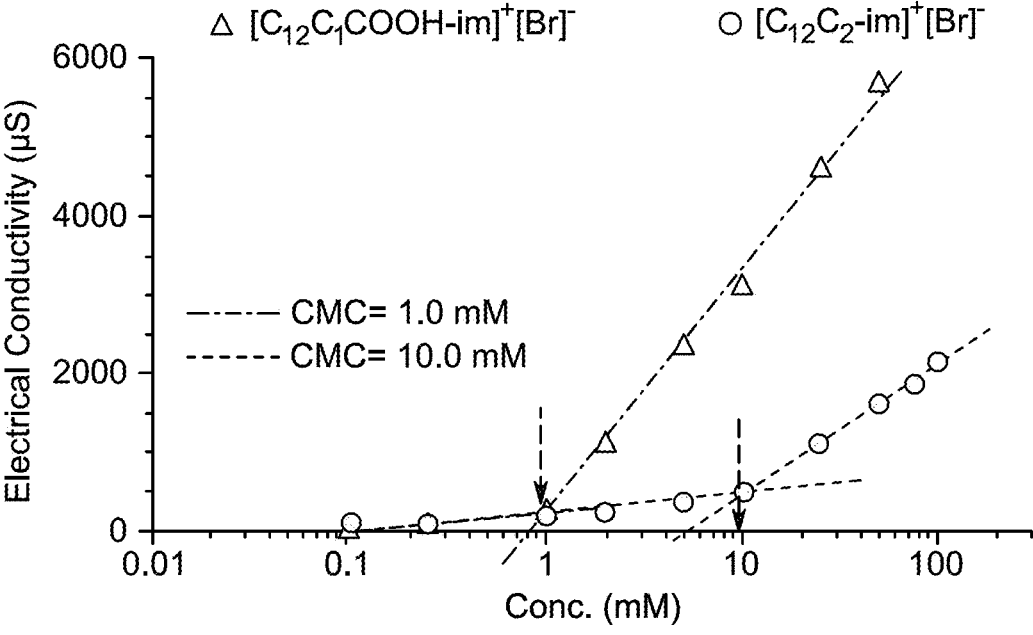

FIG. 7B shows the relationship of the electrical conductivity of aqueous ionic liquids including 1-dodecyl-3-(carboxymethyl)-imidazolium bromide $[C_{12}CCOOHim]^+[Br]^-$ or 1-dodecyl-3-ethyl-imidazolium bromide $[C_{12}C_2im]^+[Br]^-$ with the concentration ranging from 0.01 to 400 mM under an ambient condition, where the temperature is 25° C. and the pressure is 14.7 psi, according to certain embodiments.

Figure 8:
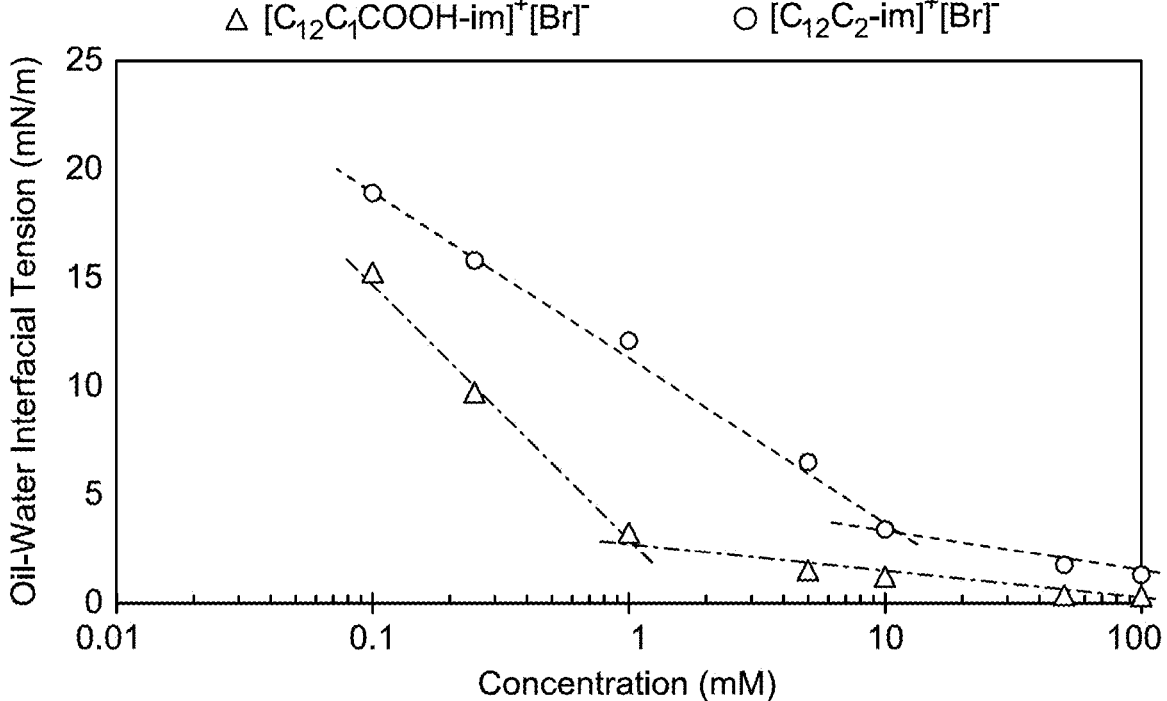

FIG. 8 shows the relationship of oil-seawater interfacial tension (IFT) of aqueous ionic liquids including 1-dodecyl-3-(carboxymethyl)-imidazolium bromide $[C_{12}C_1COOHim]^+[Br]^-$ or 1-dodecyl-3-ethyl-imidazolium bromide $[C_{12}C_2im]^+[Br]^-$ with the concentration raging from 0.01 to 100 mM under an ambient condition, where the temperature is 25° C. and the pressure is 14.7 psi, according to certain embodiments.

Figure 9A:
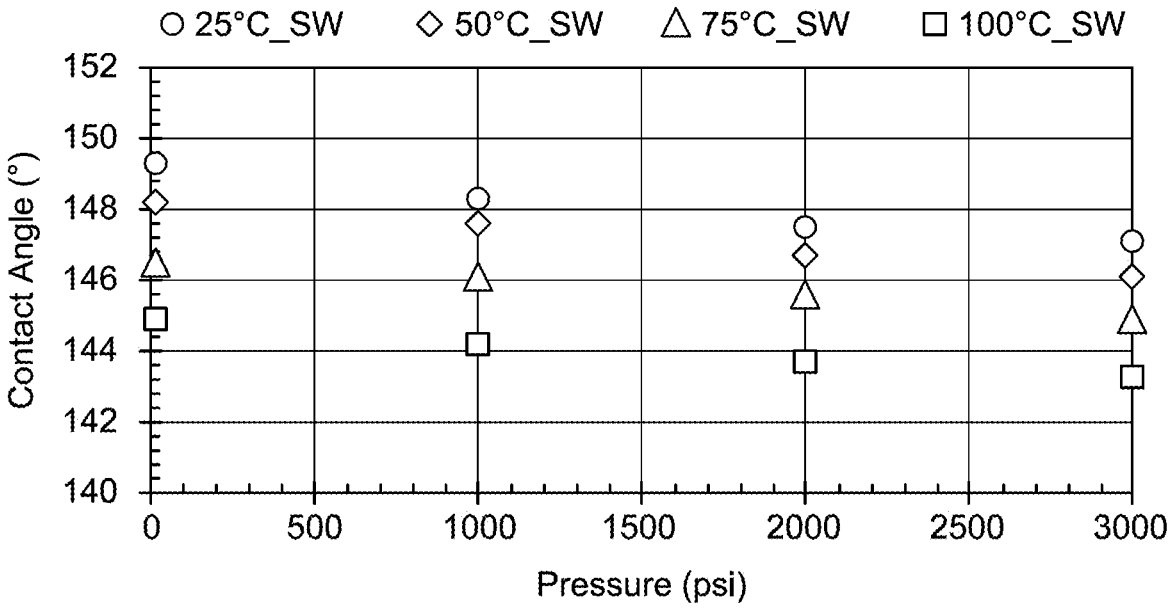

FIG. 9A shows the temperature-pressure dependency of the rock-oil-seawater contact angles in a neat system containing only seawater, according to certain embodiments.

Figure 9B:
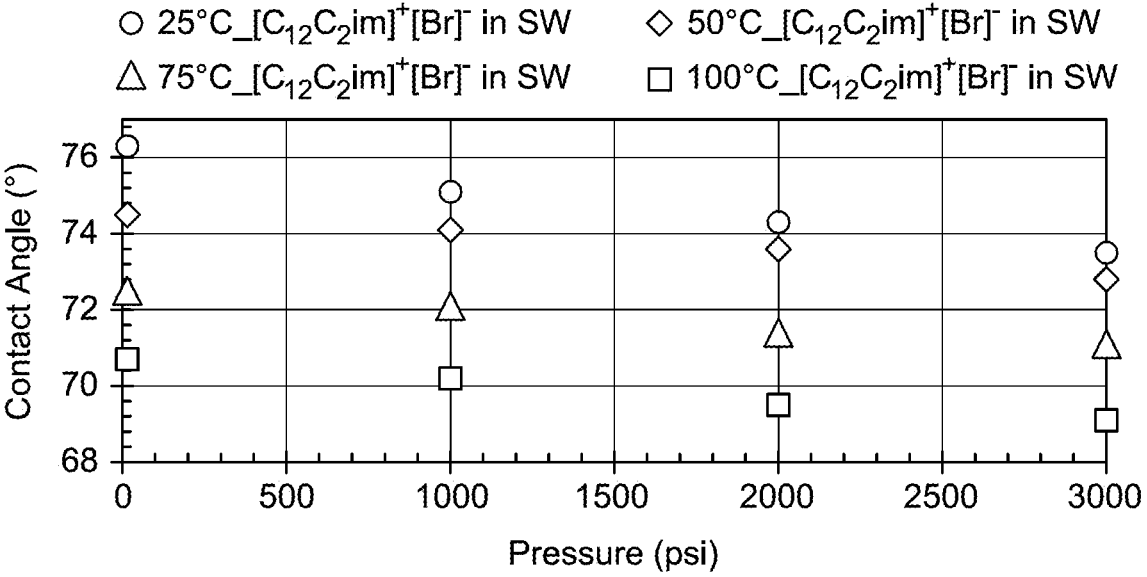

FIG. 9B shows the temperature-pressure dependency of the rock-oil-seawater contact angles in a system containing 1-dodecyl-3-ethyl-imidazolium bromide $[C_{12}C_2im]^+[Br]^-$, according to certain embodiments.

Figure 9C:
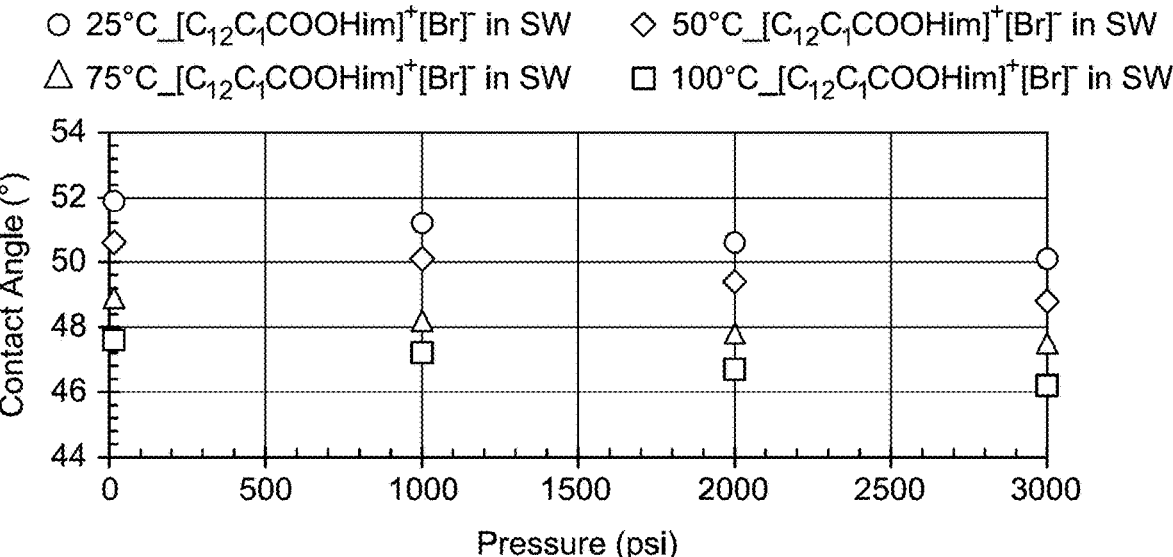

FIG. 9C shows the temperature-pressure dependency of the rock-oil-seawater contact angles in a system with 1-dodecyl-3-(carboxymethyl)-imidazolium bromide $[C_{12}C_1COOHim]^+[Br]^-$, according to certain embodiments.

Figure 10A:
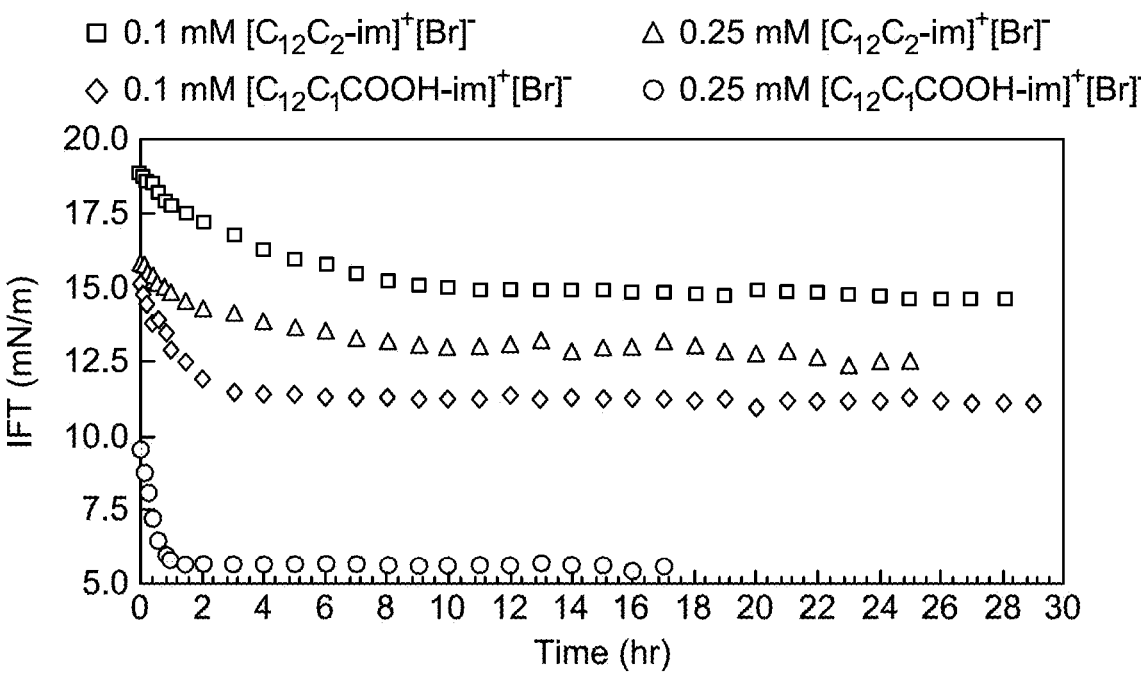

FIG. 10A shows the effect of 1-dodecyl-3-ethyl-imidazolium bromide $[C_{12}C_2im]^+[Br]^-$ and 1-dodecyl-3-(carboxymethyl)-imidazolium bromide $[C_{12}C_1COOHim]^+[Br]^-$ on the dynamic interfacial tension of oil-seawater systems over a duration of up to 30 hours, according to certain embodiments.

6

Figure 10B:
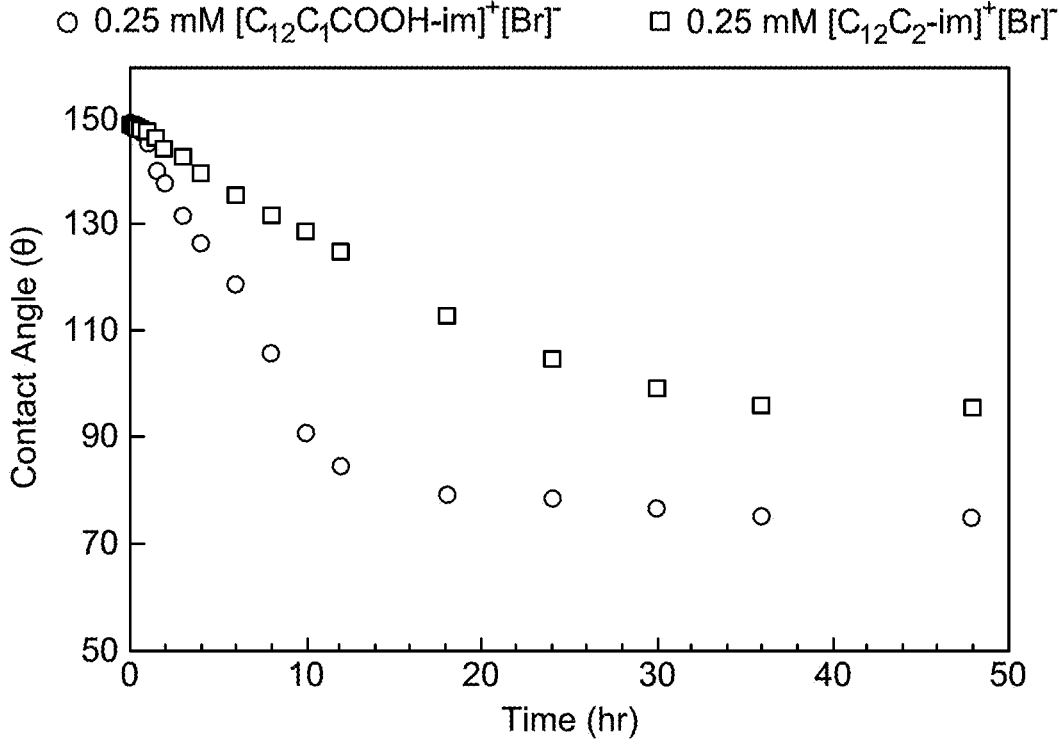

FIG. 10B shows the effect of 1-dodecyl-3-ethyl-imidazolium bromide $[C_{12}C_2im]^+[Br]^-$ and 1-dodecyl-3-(carboxymethyl)-imidazolium bromide $[C_{12}C_1COOHim]^+[Br]^-$ on the dynamic wettability changes of the rock-oil-water system during the in-situ displacement of the seawater with the ionic liquids in seawater as test fluids, according to certain embodiments.

Figure 11:
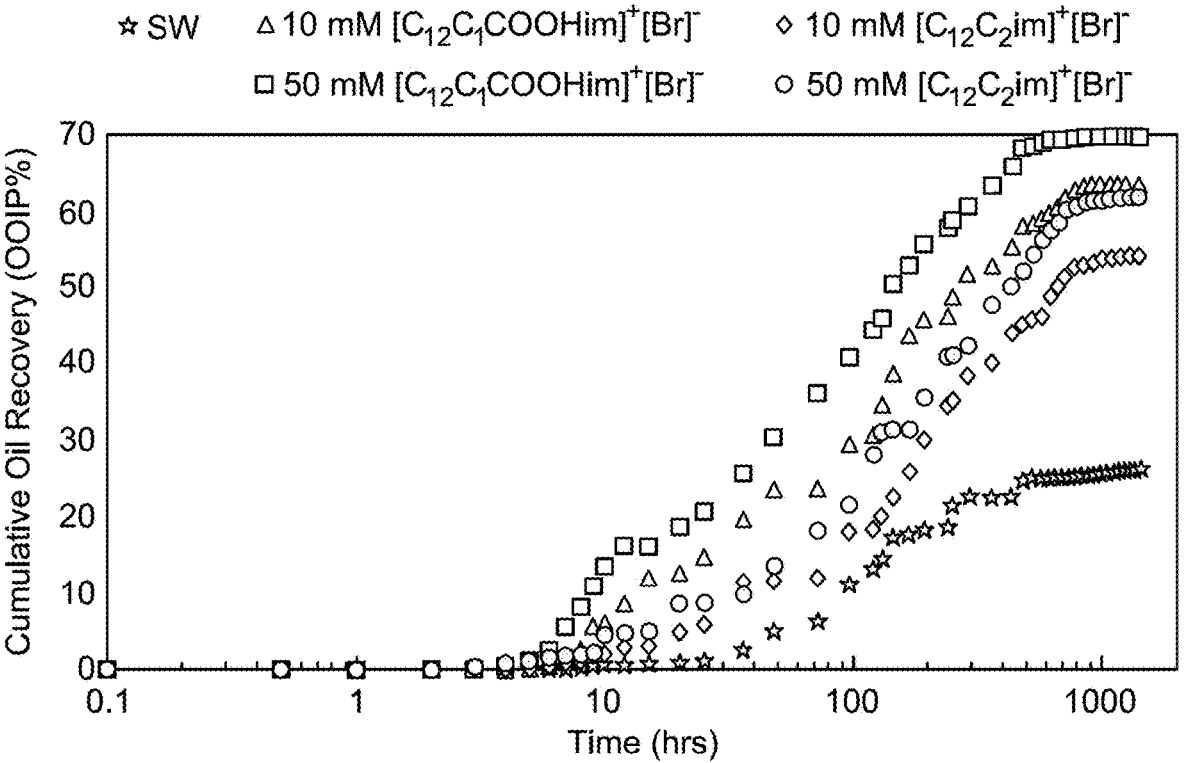

FIG. 11 shows the spontaneous imbibition characteristics of ionic liquids into an oil-wet carbonate reservoir and their contribution to oil recovery, comparing seawater, seawater with 1-dodecyl-3-ethyl-imidazolium bromide $[C_{12}C_2im]^+$ $[Br]^-$ at a concentration of 10 mM and 50 mM and seawater with 1-dodecyl-3-(carboxymethyl)-imidazolium bromide $[C_{12}CCOOHim]^+[Br]^-$ at a concentration of 10 mM and 50 mM, according to certain embodiments.

DETAILED DESCRIPTION

Embodiments of the present invention will now be described more fully hereinafter with reference to the accompanying drawings wherever applicable, in that some, but not all, embodiments of the disclosure are shown.

When describing the present disclosure, the terms used are to be construed in accordance with the following definitions, unless a context dictates otherwise.

In the drawings, like reference numerals designate identical or corresponding parts throughout the several views. Further, as used herein, the words "a", "an" and the like generally carry a meaning of "one or more", unless stated otherwise.

Furthermore, the terms "approximately", "approximate", "about" and similar terms generally refer to ranges that include the identified value within a margin of 20%, 10%, or preferably 5%, and any values therebetween.

In the drawings, like reference numerals designate identical or corresponding parts throughout the several views. Further, as used herein, the words 'a', 'an' and the like generally carry a meaning of 'one or more', unless stated otherwise.

Furthermore, the terms 'approximately', 'approximate', 'about', and similar terms generally refer to ranges that include the identified value within a margin of 20%, 10%, or preferably 5%, and any values therebetween.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

As used herein, the term 'room temperature' refers to a temperature range of '25 degrees Celsius (° C.)±3° C.

A weight percent of a component, unless specifically stated to the contrary, is based on the total weight of the formulation or composition in which the component is included. For example, if a particular element or component in a composition or article is said to have 5 percent by weight (wt. %), it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

As used herein, the term 'subterranean geological formation' refers to a naturally occurring layer of rock or sediment located beneath the Earth's surface, which may contain fluids such as oil, gas, or water.

As used herein, the term 'spontaneous imbibition test' refers to a laboratory procedure used to evaluate the ability of a porous rock sample to absorb a fluid without the application of external pressure.

As used herein, the term 'contact angle' refers to the angle formed at the junction where a liquid interface meets a solid surface, indicating the wettability of the solid by the liquid.

As used herein, the term 'interfacial tension' refers to the force per unit length existing at the boundary between two immiscible fluids, such as oil and water.

As used herein, the term 'total oil recovery' refers to the cumulative amount of oil extracted from a reservoir relative to the original oil in place.

Aspects of the present disclosure are directed at a method of recovering crude oil from a subterranean geological formation, particularly a carbonate formation, using thermally stable imidazolium-based ionic liquids (ILs) as wettability modifiers and interfacial tension (IFT) reducers. The disclosed method enables efficient crude oil displacement and extraction under high-temperature, high-pressure, and high-salinity conditions typical of deep carbonate reservoirs.

FIG. 1 illustrates a flow chart of a method 50 of recovering oil from a subterranean geological formation. The subterranean geological formation may include, but is not limited to, a depleted oil reservoir, a depleted gas reservoir, a sour reservoir, a hydrocarbon hydrocarbon-bearing subterranean formation, a saline formation, or an un-minable coal bed. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes injecting a solution comprising an imidazolium based ionic liquid and an aqueous liquid to an underground geological formation comprising crude oil and carbonate rock. The imidazolium-based ionic liquid is selected from 1-dodecyl-3-ethylimidazolium bromide and 1-dodecyl-3-(carboxymethyl)imidazolium bromide, both of which are amphiphilic compounds exhibiting strong cationic headgroups and long hydrophobic chains, capable of reducing interfacial tension and altering the wettability of carbonate surfaces.

In one embodiment, the synthesis of 1-dodecyl-3-ethyl-imidazolium bromide involves reacting n-dodecyl imidazole with 1-bromoethane under controlled heating to yield a powdered ionic liquid product with high purity. In another embodiment, 1-dodecyl-3-(carboxymethyl)-imidazolium bromide is obtained by reacting n-dodecyl imidazole with bromoacetic acid at elevated temperature, producing a powdery ionic liquid incorporating the carboxymethyl functional group on the imidazolium head. These functional variations in the cationic moiety enable tailored hydrophilic-lipophilic balance (HLB) and interfacial performance in saline and high-temperature environments.

The ionic liquids were thoroughly characterized using $^1H$-NMR, FTIR, and thermogravimetric analysis (TGA). The NMR spectra confirmed the successful alkylation of the imidazole ring, while FTIR analysis verified the presence of characteristic C—N, C—H, and carboxylic functional group vibrations. In certain embodiments, the imidazolium-based ionic liquids exhibit high thermal stability, ensuring their structural integrity and functional performance under elevated reservoir temperatures. Thermal gravimetric analysis (TGA) of the ionic liquids demonstrates a weight loss of only 1 to 5 wt. %, preferably 1 to 4 wt. %, preferably 2 to 5 wt. %, preferably 3 to 4 wt. % at a temperature between 18° and 200° C., preferably 190 to 200° C., preferably 180 to 190° C., preferably 185 to 195° C. based on the total weight of the ionic liquid, indicating minimal degradation when subjected to harsh sub-surface environments. This thermal resilience prevents decomposition or volatilization during the injection and flooding operations, allowing the ionic liquids to maintain their amphiphilic properties and interfacial activity throughout the enhanced oil recovery process. In one embodiment, the imidazolium-based ionic liquids further possess a decomposition temperature in the range of 250 to 300° C., preferably 250 to 290° C., preferably 260 to 280° C., preferably 270 to 290° C., confirming their suitability for high-temperature carbonate reservoirs typically found at depths exceeding 2500 meters. The high decomposition temperature ensures long-term stability and sustained interfacial activity even after prolonged exposure to reservoir heat and brine salinity.

The aqueous liquid may include water, a saline solution having a salinity of 1 to 300 kppm, or seawater having a salinity of 30 to 50 kppm, depending on the reservoir conditions and the ionic liquid concentration. In some embodiments, the solution may optionally include any number of suitable additives. Exemplary additives include, but are not limited to, weighting agents, emulsifiers, viscosities, fluid-loss control agents, bridging agents, pH controlling agents, defoamers, clay stabilizers, anti-scalants, deflocculants, lubricants, gelling agents, corrosion inhibitors, rheology control modifiers or thinners, high temperature/high pressure control additives, acids, alkalinity agents, pH buffers, fluorides, gases, nitrogen, carbon dioxide, surface modifying agents, tackifying agents, foamers, catalysts, clay control agents, biocides, bactericides, friction reducers, antifoam agents, dispersants, flocculants, $H_2S$ scavengers, $CO_2$ scavengers, oxygen scavengers, friction reducers, breakers, relative permeability modifiers, resins, particulate materials (e.g., proppant particulates), wetting agents, coating enhancement agents, filter cake removal agents, odorants, shale stabilizers, and the like. A person of ordinary skill in the art, with the benefit of this disclosure, will recognize the types and suitable amounts of additives that may be included in the aqueous solution for a particular application, without undue experimentation.

In one embodiment, the injection step involves introducing the solution comprising 1-dodecyl-3-ethyl-imidazolium bromide at a concentration of 45 to 55 mM, preferably 45 to 52 mM, preferably 48 to 50 mM, preferably 45 to 52 mM in seawater. A carbonate rock aged with the injected solution under ambient conditions for 30 to 40 days, preferably 30 to 38 days, preferably 32 to 28 days, preferably 35 to 40 days, preferably 30 to 35 days, exhibited a rock-oil-seawater contact angle of 72° to 76°, preferably 72° to 75°, preferably 73° to 75°, preferably 74° to 76°, at a temperature of 20 to 50° C., preferably 20 to 40° C., preferably 20 to 30° C., preferably 30 to 50° C., preferably 40 to 50° C., preferably 30 to 40° C. and a pressure of 1500 to 3000 psi, preferably 1500 to 2000 psi, preferably 1800 to 2500 psi, preferably 2000 to 3000 psi, indicating a transition from oil-wet to intermediate-wet conditions. At higher temperatures, between 70 to 100° C., preferably 80 to 90° C., preferably 70 to 80° C., preferably 70 to 90° C., preferably 75 to 80° C. the same rock exhibited a reduced contact angle of 68° to 72°, preferably 68° to 71°, preferably 69° to 70°, preferably 68° to 70°, reflecting enhanced wettability alteration.

In another embodiment, the solution includes 1-dodecyl-3-(carboxymethyl)-imidazolium bromide at a concentration of 45 to 55 mM preferably 45 to 52 mM, preferably 48 to 50 mM, preferably 45 to 52 mM in seawater was injected and aged with carbonate rock under similar conditions. The aged rock exhibited a contact angle of 48° to 52°, preferably 48° to 51°, preferably 49° to 50°, preferably 50° to 52° at 20 to 50° C., preferably 30 to 50° C., preferably 40 to 50° C., preferably 30 to 40° C. The aged rock exhibited a contact angle of 44° to 48°, preferably 44° to 47°, preferably 45° to 48°, preferably 46° to 47° at 70 to 100° C. preferably 80 to 90° C., preferably 70 to 80° C., preferably 70 to 90° C., preferably 75 to 80° C., demonstrating a stronger shift toward water-wet behavior due to the carboxymethyl functionalization that enhances polarity and rock-fluid interactions.

The ionic liquids were investigated for micellar formation and surface activity by measuring their water-air surface tension (SFT) and electrical conductivity as a function of concentration and temperature. In an embodiment, the 1-dodecyl-3-ethyl-imidazolium bromide possesses a critical micelle concentration (CMC) of 10 to 15 mM, while 1-dodecyl-3-(carboxymethyl)-imidazolium bromide exhibits a lower CMC of 1 to 5 mM, owing to the presence of the carboxymethyl substituent which enhances hydrophilicity and facilitates micelle formation at lower concentrations. When these ionic liquids are used at concentrations above their respective CMC values, they self-assemble into micellar aggregates capable of solubilizing crude oil molecules and reducing interfacial tension at the oil-water and rock-fluid interfaces.

In certain embodiments, the solution including 1-dodecyl-3-ethyl-imidazolium bromide and water, when formulated above the CMC, exhibits an air-water interfacial surface tension on carbonate rock of 30 to 40 mN/m, preferably 30 to 35 mN/m, preferably 30 to 38 mN/m, preferably 35 to 40 mN/m at ambient temperature and a significantly reduced value of 1 to 6 mN/m, preferably 1 to 5 mN/m, preferably 2 to 5 mN/m, preferably 2 to 4 mN/m at a temperature of 50 to 70° C., preferably 50 to 60° C., preferably 50 to 65° C., preferably 60 to 70° C. under an applied pressure of 10 to 30 psi, preferably 10 to 20 psi, preferably 20 to 30 psi. The reduction in interfacial tension with temperature demonstrates the enhanced molecular mobility and adsorption of the ionic liquid on the rock surface, leading to effective wettability alteration and mobilization of trapped oil.

In another embodiment, the solution comprising 1-dodecyl-3-(carboxymethyl)-imidazolium bromide and water, when used above its CMC, exhibits an air-water interfacial surface tension of 25 to 40 mN/m, preferably 25 to 35 mN/m, preferably 30 to 38 mN/m, preferably 35 to 40 mN/m at ambient temperature and 1 to 6 mN/m, preferably 1 to 5 mN/m, preferably 2 to 5 mN/m, preferably 2 to 4 mN/m at 50 to 70° C. preferably 50 to 60° C., preferably 50 to 65° C., preferably 60 to 70° C., under similar pressure conditions.

In yet another embodiment, the ionic liquid solution is prepared using seawater as the aqueous medium to evaluate salinity tolerance and interfacial behavior under realistic reservoir brine conditions. The solution of 1-dodecyl-3-ethyl-imidazolium bromide in seawater exhibits an oil-seawater interfacial surface tension on carbonate rock in the range of 1 to 5 mN/m, preferably 1 to 4 mN/m, preferably 2 to 5 mN/m, preferably 2 to 4 mN/m at ambient temperature, indicating that the ionic liquid remains active and effective even in high-salinity environments. Similarly, the solution comprising 1-dodecyl-3-(carboxymethyl)-imidazolium bromide above its CMC in seawater exhibits an oil-seawater interfacial surface tension of 0.1 to 5 mN/m, preferably 0.5 to 5 mN/m, preferably 1 to 5 mN/m, preferably 2 to 4 mN/m at ambient temperature, demonstrating superior interfacial reduction performance attributed to the enhanced hydrophilicity and ionic compatibility of the carboxymethyl substituent in saline media.

In one embodiment, the solution includes 1-dodecyl-3-ethyl-imidazolium bromide at a concentration of 0.1 to 0.3 mM in seawater, where the solution achieves an equilibrium oil-seawater interfacial surface tension of 12 to 17 mN/m, preferably 12 to 15 mN/m, preferably 13 to 15 mN/m, preferably 12 to 14 mN/m after a contact duration of 8 to 12 hours, preferably 8 to 11 hours, preferably 9 to 11 hours, preferably 10 to 12 hours. In another embodiment, the solution includes 1-dodecyl-3-(carboxymethyl)-imidazolium bromide at a concentration of 0.1 to 0.2 mM in seawater, where the system achieves equilibrium interfacial surface tension between the carbonate rock, crude oil, and seawater at a value of 10 to 12 mN/m, preferably 10 to 11 mN/m, preferably 11 to 12 mN/m after 2 to 4 hours of contact, preferably 2 to 3 hours, preferably 3 to 4 hours.

In a further embodiment, when the concentration of 1-dodecyl-3-(carboxymethyl)-imidazolium bromide is increased to 0.2 to 0.3 mM, equilibrium is achieved even more rapidly-within 0.5 to 2 hours, with an interfacial tension value of 5 to 7 mN/m, preferably 5 to 6 mN/m, preferably 6 to 7 mN/m. This substantial and accelerated reduction in interfacial tension demonstrates the ionic liquid's high amphiphilicity, efficient adsorption kinetics, and enhanced capacity to disrupt cohesive forces at the oil-seawater boundary.

These embodiments collectively illustrate that the imidazolium-based ionic liquids described herein are thermally and chemically stable under reservoir conditions, exhibit tunable surface and interfacial properties, and maintain performance across a range of salinity and temperatures. Such characteristics make them particularly suitable for application in enhanced oil recovery from carbonate formations, where high temperature, pressure, and salinity often limit the effectiveness of conventional surfactants.

At step 54, the method 50 includes flooding a portion of the underground geological formation with the solution at a temperature of 80 to 150° C. under a pressure of 1500 to 3000 psi to displace the crude oil and from the carbonate rock. The purpose of this step is to displace crude oil adhered to and trap within the carbonate rock matrix. In an embodiment, the flooding operation is carried out by injecting the solution through an injection well into the formation, wherein the solution penetrates the pore network of the carbonate rock, displacing the immobile crude oil toward a production well. In some embodiments, the flooding may be performed continuously until the desired recovery factor is achieved, or in alternate cycles with water or saline flooding to optimize sweep efficiency. The duration of the flooding process may range from 900 to 1200 hours, depending on formation porosity, permeability, and oil viscosity.

In an embodiment, the ionic liquid concentration in the flooding fluid may be maintained at 5 to 10 mM, preferably 5 to 9 mM, preferably 6 to 9 mM, preferably 7 to 9 mM for moderate-wet formations or increased to 40 to 60 mM, preferably 40 to 50 mM, preferably 50 to 60 mM, preferably 45 to 55 mM for highly oil-wet carbonate systems to achieve optimum displacement efficiency. The process results in a significant enhancement in cumulative oil recovery of between 50% and 80% of the original oil in place.

At step 56, the method 50 includes extracting the crude oil from the underground geological formation. The extraction may be carried out using conventional pumping or pressure-assisted techniques to recover the mobilized crude oil efficiently. The overall method thus provides an effective, thermally stable, and salinity-tolerant approach to enhanced oil recovery under harsh reservoir conditions, enabling efficient displacement and extraction of crude oil from carbonate formations.

EXAMPLES

The following examples demonstrate a method of enhanced oil recovery using an imidazolium based ionic liquid as described herein. The examples are provided solely for illustration and are not to be construed as limitations of the present disclosure, as many variations thereof are possible without departing from the spirit and scope of the present disclosure.

Example 1: Synthesis of Dodecyl Imidazole

One mole (1 equivalent) of imidazole was placed in a round-bottom (RB) flask, and an adequate amount of tetrahydrofuran (THF) was added as a solvent. The mixture was stirred in an ice-cold bath for a minimum of 20 minutes. Subsequently, one mole (1 equivalent) of sodium hydride (NaH) was added to the RB flask in a single portion, and stirring continued for an additional 1 hour. The temperature was gradually increased to reach reflux conditions (70-80° C.), and 0.9 equivalents of bromododecane were cautiously added dropwise. The mixture was then refluxed overnight. After confirming completion of the reaction, the product was filtered, and the remaining THF was removed by vacuum evaporation. The resulting residue was subjected to thorough hot water extraction, repeated at least three times, yielding a brown-colored product.

Example 2: Synthesis of Ionic Liquid Surfactants $[C_{12}C_1COOHim][Br]^-$ and $[C_{12}C_2im]^+[Br]^-$ Approximately 1.2 equivalents of dodecyl imidazole were placed in a 50-mL RB flask, to which 1 equivalent of either 1-bromoethane or bromoacetic acid was added at room temperature. Acetonitrile was then introduced as the solvent, and the reaction mixture was refluxed overnight. Upon completion of the reaction, the solvent was efficiently removed under reduced pressure using a rotary evaporator. For the reaction involving bromoacetic acid, the resulting residue underwent thorough washing with acetone, repeated at least three times, ultimately yielding a white-colored powder indicative of successful synthesis of the acid-modified dodecyl imidazole, $[C_{12}C_1COOHim]^+[Br]^-$. In the case of the reaction with 1-bromoethane, the residual brown-colored product, $[C_{12}C_2im]^+[Br]^-$, was obtained and washed thoroughly with ethyl acetate and diethyl ether. Later, the $^1H$ NMR spectra for both the compounds was recorded and the data and their spectra are herewith provided:

$^1H$-NMR of $[C_{12}C_1COOHim]^+[Br]^-$: White solid, $^1H$ NMR (500 MHz, DMSO) δ 9.18 (s, 1H), 7.81 (d, J=1.5 Hz, 1H), 7.75 (t, J=1.5 Hz, 1H), 5.12 (s, 2H), 4.22 (t, J=7.1 Hz, 2H), 1.81-1.74 (m, 2H), 1.24 (d, J=16.1 Hz, 18H), 0.84 (t, J=6.9 Hz, 3H).

$^1H$-NMR of $[C_{12}C_2im][Br]^-$: Brown liquid, $^1H$ NMR (500 MHz, DMSO) δ 9.41 (s, 1H), 7.85 (d, J=4.8 Hz, 1H), 7.83 (s, 1H), 4.33-4.00 (m, 4H), 1.75 (dd, J=13.8, 6.9 Hz, 2H), 1.38 (t, J=7.3 Hz, 3H), 1.18 (s, 18H), 0.79 (t, J=6.7 Hz, 3H).

The synthesized ILs were characterized using Nuclear magnetic resonance (NMR, make—Bruker) spectrometer—500 MHz with deuterated dimethyl sulfoxide (DMSO) as the solvent. The resonance signals corresponding to various functional groups and their protons are identified in FIG. 2A, FIG. 2B, FIG. 3 & FIG. 4 by marking their corresponding chemical shifts. The synthesized ILs were characterized using $^1H$-NMR spectroscopy using deuterated-dimethyl sulfoxide (DMSO) as the solvent. The resonance signals corresponding to various functional groups and their protons are identified in the FIG. 2A, FIG. 2B, FIG. 3 & FIG. 4 by marking their corresponding chemical shifts. Further, the observed peaks were integrated, and they correlate well with the number of protons of the ILs chemical structures as depicted in their schematic in FIG. 3.

$^1H$-NMR of $[C_{12}C_1COOHim]^+[Br]^-$ White solid, $^1H$ NMR (500 MHz, DMSO) δ 9.18 (s, 1H), 7.81 (d, J=1.5 Hz, 1H), 7.75 (t, J=1.5 Hz, 1H), 5.12 (s, 2H), 4.22 (t, J=7.1 Hz, 2H), 1.81-1.74 (m, 2H), 1.24 (d, J=16.1 Hz, 18H), 0.84 (t, J=6.9 Hz, 3H). $^1H$-NMR of $[C_{12}C_2im]^+[Br]^-$ (FIG. 3) Brown liquid, $^1H$ NMR (500 MHz, DMSO) δ 9.41 (s, 1H), 7.85 (d, J=4.8 Hz, 1H), 7.83 (s, 1H), 4.33-4.00 (m, 4H), 1.75 (dd, J=13.8, 6.9 Hz, 2H), 1.38 (t, J=7.3 Hz, 3H), 1.18 (s, 18H), 0.79 (t, J=6.7 Hz, 3H). Both the ILs showed all the characteristic peaks without any extra peaks, indicating the purity of the synthesized ionic liquids.

Fourier-transform infrared (FTIR) spectra for both ILs, $[C_{12}C_2im]^+[Br]^-$ and $[C_{12}C_1COOHim]^+[Br]^-$, are depicted in FIG. 5A. In both the ILs, the bands that observed between 2800 to 3000 are attributed to the C—H stretching vibrations corresponding to substituted alkyl chains on the imidazolium cation. The bands around 3000-3100 cm$^{-1}$ correspond to the antisymmetric and symmetric C—H vibrational modes of the imidazolium ring [See: Jeon, Y.; Sung, J.; Seo, C.; Lim, H.; Cheong, H.; Kang, M.; Moon, B.; Ouchi, Y.; Kim, D. *Structures of Ionic Liquids with Different Anions Studied by Infrared Vibration Spectroscopy. Journal of Physical Chemistry B* 2008, 112 (15), 4735-4740, which is incorporated herein by reference in its entirety]. A broad band at 3300 cm$^{-1}$ in $[C_{12}C_2im]^+[Br]^-$ is assigned to the O—H stretching vibrations due to the surface-bound and entrapped water molecules. The band at 1710 cm$^{-1}$ in $[C_{12}C_1COOHim]^+[Br]^-$, can be attributed to the carbonyl stretching frequency of the COOH group [See: Xu, T.; Schwarz, M.; Werner, K.; Mohr, S.; Amende, M.; Libuda, J. *Structure-Dependent Anchoring of Organic Molecules to Atomically Defined Oxide Surfaces: Phthalic Acid on Co3O4(111), CoO(100), and CoO(111). Chemistry A European Journal* 2016, 22 (15), 5384-5396; Babu M. K., S.; Katchala, N.; Sivakumar Natarajan, T.; Suresh, S.; Kancharla, S. *Nd(III) and Dy(III) Extraction from Discarded NdFeB Magnets Using TOPO-Based Hydrophobic Eutectic Solvents. J Mol Liq* 2024, 402, 124697, which are incorporated herein by reference in its entirety]. Thus, both ILs have all the characteristic peaks, confirming the successful formation of both ILs and the presence of their functional groups.

Thermogravimetric Analysis (TGA) was analyzed to understand the thermal stability of $[C_{12}C_2im]^+[Br]^-$ and $[C_{12}C_1COOHim]^+[Br]^-$, and the results are presented in FIG. 5B. A small mass loss observed for $[C_{12}C_2im]^+[Br]^-$ is attributed to the removal of externally bound or entrapped water molecules. In contrast, $[C_{12}C_1COOHim]^+[Br]^-$, does not show such a change up to 200° C., indicating the reversal of polarity by the incorporation of the polar functional group. Both ILs exhibited a single large degradation stage in the range of 250° C. to 350° C., with 100% mass loss. The average decomposition temperature was found to be around 270° C. [See: Ding, Y. S.; Zha, M.; Zhang, J.; Wang, S. S. *Synthesis, Characterization and Properties of Geminal Imidazolium Ionic Liquids. Colloids Surf A Physicochem Eng Asp* 2007, 298 (3), 201-205; Kamboj, R.; Singh, S.; Chauhan, V. Synthesis, *Characterization and Surface Properties of N-(2-Hydroxyalkyl)-N'-(2-Hydroxyethyl)Imidazolium Surfactants. Colloids Surf A Physicochem Eng Asp* 2014, 441, 233-241, which is incorporated herein by reference in its entirety].

IL solutions in deionized water (DIW) and/or seawater (SW) with varying concentrations ranging from 0 to 100 mM $dm^3$ were prepared, and their stability was evaluated using high-temperature, high-pressure (HTHP) cells to assess their suitability under harsh environmental conditions. The tests were performed at the maximum IL concentration of 100 mM, where no significant sedimentation or degradation was observed. Subsequently, aqueous IL solutions (0-100 mM in DIW) were examined to determine their surface tension and electrical conductivity. All test fluids were prepared using double-distilled Milli-Q water, thoroughly mixed, and sonicated for at least one hour to ensure homogeneity and removal of contaminants. The solutions were then filtered through a 0.45 m membrane to eliminate residual particulates. The IFT-700 interfacial tensiometer (Vinci Technologies) was utilized to measure both air-water surface tension and oil-water interfacial tension employing the pendant drop method, as illustrated in FIG. 6. This method quantifies the force required to hold the surface of a phase together. This setup contains accumulators for holding fluid samples, manual syringe pumps, a capillary or syringe with a needle for fluid loading—protruding from the top for surface tension measurements and flipped up for oil-water interfacial tension measurements, an electric heating controller, a pressure controller with a monitor, a viewing cell, a high-resolution camera, a light source, tubing, valves, and computer-controlled software for drop shape analysis.

For surface tension measurements, an aqueous phase droplet is formed in the atmospheric air phase from the top of the aqueous container using a sharp needle (as depicted in FIG. 6). In oil-water interfacial tension measurements, the cell was prefilled with the aqueous phase (test fluids such as DIW, SW, or ILs in DIW), after which an oil droplet was produced from the bottom of the sample cell. The static drop was stabilized at its maximum size just before detachment and then photographed using a high-quality camera. The droplet dimensions were determined through built-in software, and the interfacial forces were calculated using Equation (1):

$$\sigma = \frac{\Delta\rho g D}{H}$$

$\Delta\rho$ is the density difference between air and water, as well between oil and water; D denotes the maximum diameter of the drop; g stands for the gravitational force; H is the drop shape coefficient as the function of S=d/D [See: Berry, J. D.; Neeson, M. J.; Dagastine, R. R.; Chan, D. Y. C.; Tabor, R. F. *Measurement of Surface and Interfacial Tension Using Pendant Drop Tensiometry. J Colloid Interface Sci* 2015, 454, 226-237; Drelich, J. W.; Fang, Ch.; White, C. *Measurement of Interfacial Tension in Fluid/Fluid Systems. Encyclopedia of surface and colloid science*; Stauffer, C. E. *The Measurement of Surface Tension by the Pendant Drop Technique. Journal of Physical Chemistry* 1965, 69 (6), 1933-1938, which are incorporated herein by reference in its entirety]. Each measurement was repeated at least three times to ensure accuracy, with the standard uncertainty observed as <0.05 mN/m. Reported values represent the average of repeated measurements.

Prior to experimentation, the probe and needle were thoroughly cleaned, and the surface tension of double-distilled Milli-Q water was measured to establish a reference value. The measured surface tension was 71.79 mN/m, closely matching the literature value of 72.05 mN/m at 25° C. and atmospheric pressure [See: Vargaftik, N. B.; Volkov, B. N.; Voljak, L. D. *International Tables of the Surface Tension of Water. J Phys Chem Ref Data* 1983, 12 (3), 817-820, which is incorporated herein by reference in its entirety]. Similarly, the interfacial tension for a known system, heptane-water at 25° C., was measured as 51.33 mN/m, in close agreement with the reported value of 50.71 mN/m [See: Zeppieri, S.; Rodriguez, J.; López De Ramos, A. L. *Interfacial Tension of Alkane+Water Systems. J Chem Eng Data* 2001, 46 (5), 1086-1088, which is incorporated herein by reference in its entirety].

Subsequently, the electrical conductivities of the test fluids were determined using an instrument equipped with an in-built electrode and a nominal cell constant (k=1.0), along with a temperature sensor. The device measured conductance in the range of 0.0-200.0 mS with an uncertainty of ±1%. Calibration was performed using standard solutions of known concentrations. Conductivity values for all IL solutions were then recorded, with each measurement repeated at least three times, and average values reported.

The critical micelle concentration (CMC) is an essential physicochemical parameter for characterizing surfactant surface activity and aggregation behavior. The CMC was determined from surface tension measurements across varying IL concentrations under ambient conditions (FIG. 7A). The plot shown in FIG. 7A, exhibits two distinct regions before and after the CMC value. The intersection of the fitted curves for these regions yielded CMC values of 1.0 mM and 12.0 mM for $[(C_{12}C_1COOHim]^+[Br]^-$ and $[C_{12}C_2im][Br]^-$, respectively. Increasing IL concentration significantly reduced water surface tension, with the effect being more pronounced for the acid-functionalized IL, $[C_{12}C_1COOHim]^+[Br]^-$. This reduction can be attributed to the adsorption of IL molecules at the water-air interface, which disrupts interfacial hydrogen bonding, thereby decreasing surface tension. As expected, higher IL concentrations resulted in increased surface coverage and a corresponding reduction in surface tension [See: Russo, J. W.; Hofmann, M. M. *Measurements of Surface Tension and Chemical Shift on Several Binary Mixtures of Water and Ionic Liquids and Their Comparison for Assessing Aggregation. J Chem Eng Data* 2011, 56 (9), 3703-3710, which is incorporated herein by reference in its entirety].

At maximum concentration of 100 mM, $[C_{12}C_2im]^+[Br]^-$ decreased surface tension from 72.05 mN/m to 34.98 mN/m, while $[C_{12}C_1COOHim][Br]^-$ achieved a lower value of 31.04 mN/m. The onset of surface tension reduction was more evident even at lower concentrations ILs, for both cases. However, the acid functionalized IL showed a more pronounced and earlier plateau (1-3 mM) compared to and achieved an early plateau around 1 to 3 mM, compared to $[C_{12}C_2im]^+[Br]^-$ which reached a plateau only between 10 to 30 mM.

The influence of temperature on air-water surface tension in the presence of ILs was also examined, as shown in Table 1. Increasing the temperature from 25° C. to 75° C. caused a notable reduction in surface tension values—approximately 4 to 6 mN/m from 25° C. to 50° C. and an additional 2 to 4 mN/m at 75° C. This behavior is consistent with the known temperature dependence of hydrogen bonding in water; higher temperatures weaken hydrogen bonds at the interface, facilitating greater IL adsorption and further surface tension reduction. Thus, ILs tend to get positioned more at the interface rather than in the bulk fluid [See: Sakthivel, S. *Imidazolium Based Ionic Liquids for Enhanced Oil Recovery on the Carbonate Reservoir. J Mol Liq* 2022, 366, 120284; Kanj, M.; Sakthivel, S.; Velusamy, S.; Gardas, R. L.; Sangwai, J. S. *Adsorption of Aliphatic Ionic Liquids at Low Waxy Crude Oil—Water Interfaces and the Effect of Brine, Colloids Surf A Physicochem Eng Asp* 2015, 468, 62-75; Sakthivel. S.; Abdel-Azeim, S.; AlSaif B.; Al-Abdrabalnabi, R. *Investigating the Role of [PF6]- and [BF4]- Based Ionic Liquids for Enhanced Oil Recovery in Carbonate Reservoirs: Experimental and Molecular Simulation Insights. J Mol Liq* 2023, 390, 123006; Sakthivel, S.; Velusamy, S.; Gardas, R. L.; Sangwai, J. S. *Use of Aromatic Ionic Liquids in the Reduction of Surface Phenomena of Crude Oil-Water System and Their Synergism with Brine. Ind Eng Chem Res* 2015, 54 (3), 968-978; Sakthivel, S.; Chhotaray. P. K.; Velusamy, S.; Gardas, R. L.; Sangwai, J. S. *Synergistic Effect of Lactam. Ammonium and Hydroxyl Ammonium Based Ionic Liquids with and without NaCl on the Surface Phenomena of Crude Oil/Water System. Fluid Phase Equilib* 2015, 398, 80-97; Sakthivel, S.; Velusamy, S.; Nair, V. C.; Sharma, T.; Sangwai, J. S. *Interfacial Tension of Crude Oil-Water System with Imidazolium and Lactam-Based Ionic Liquids and Their Evaluation for Enhanced Oil Recovery under High Saline Environment. Fuel* 2017, 191, 239-250; Russo, J. W.; Hofmann, M. M. *Measurements of Surface Tension and Chemical Shift on Several Binary Mixtures of Water and Ionic Liquids and Their Comparison for Assessing Aggregation. J Chem Eng Data* 2011, 56 (9), 3703-3710; James-Smith, A. A.; Alford, K.; Shah, D. O. *A Novel Method to Quantify the Amount of Surfactant at the Oil/Water Interface and to Determine Total Interfacial Area of Emulsions. J Colloid Interface Sci* 2007, 310 (2), 590-598; Velusamy, S.; Sakthivel, S.; Sangwai, J. S. *Effect of Imidazolium-Based Ionic Liquids on the Interfacial Tension of the Alkane-Water System and Its Influence on the Wettability Alteration of Quartz under Saline Conditions through Contact Angle Measurements. Ind Eng Chem Res* 2017, 56 (46), 13521-13534; Sakthivel, S.; Gardas, R. L.; Sangwai, J. S. *Effect of Alkyl Ammonium Ionic Liquids on the Interfacial Tension of the Crude Oil-Water System and Their Use for the Enhanced Oil Recovery Using Ionic Liquid-Polymer Flooding. Energy & Fuels* 2016, 30 (3), 2514-2523; Abdel-Azeim, S.; Sakthivel, S.; Kandiel, T. A.; Kanj, M. Y. *Specificity and Synergy at the Oil-Brine Interface: New Insights from Experiments and Molecular Dynamics Simulations. Energy and Fuels* 2021, 35 (18), 14647-14657; Sakthivel, S. *Wettability Alteration of Carbonate Reservoirs Using Imidazolium-Based Ionic Liquids. ACS Omega* 2021, 6 (45), 30315-30326, which are incorporated herein by reference in its entirety].

TABLE 1

Surface tension data of the air-water system for the two ILs of $[C_{12}C_1COOHim]^+[Br]^-$ and $[C_{12}C_2im]^+[Br]^-$ as a function of ILs concentration and temperature.

| | Temperature (° C.) | | |
| | 25 | 50 | 75 |
| Conc. (mM) | Surface tension (mN/m) | | |
| --- | --- | --- | --- |
| $[C_{12}C_1COOHim]^+[Br]^-$ | | | |
| 0 | 72.05 | 68.71 | 66.38 |
| 0.1 | 61.83 | 56.38 | 54.36 |
| 0.25 | 52.37 | 47.98 | 45.25 |
| 1 | 36.87 | 33.59 | 31.85 |
| 5 | 35.44 | 31.95 | 30.51 |
| 10 | 33.39 | 28.36 | 27.55 |
| 50 | 31.78 | 26.89 | 25.69 |
| 100 | 31.05 | 25.36 | 25.11 |
| $[C_{12}C_2im]^+[Br]^-$ | | | |
| 0 | 72.05 | 68.71 | 66.38 |
| 0.1 | 63.69 | 60.35 | 58.35 |
| 0.25 | 60.23 | 57.26 | 55.69 |
| 1 | 52.22 | 50.36 | 49.36 |
| 5 | 43.79 | 40.36 | 39.89 |
| 10 | 39.03 | 37.59 | 35.68 |
| 50 | 35.38 | 33.64 | 32.55 |
| 100 | 34.98 | 32.58 | 31.84 |

The reduction in surface tension was more significant for the acid-based IL $[C_{12}C_1COOHim]\sim[Br]^-$ than for the non-functionalized $[C_{12}C_2im]^+[Br]^-$, owing to the carboxylic group's enhanced hydrogen-bonding capability compared to the methyl group. Electrical conductivity measurements of aqueous IL solutions revealed a direct proportionality between conductivity and IL concentration (FIG. 7B). The CMC values determined from conductivity data (1.0 mM and 10.0 mM for $[C_{12}C_1COOHim]^-[Br]^-$ and $[C_{12}C_2im]^+$ $[Br]^-$, respectively) were consistent with those obtained from surface tension analysis. Both techniques thus yielded comparable CMC values for the synthesized ILs.

As shown in FIG. 8, the measured oil-seawater interfacial tension (IFT) at various concentrations of the ILs was measured and assessed their CMCs to be approximately 1 mM and 10 mM for the ILs, $[C_{12}C_1COOHim]^+[Br]^-$, and $[C_{12}C_2im]^+[Br]^-$, respectively. The degree of IFT reduction was significantly greater than that observed for conventional ILs [See: Sakthivel, S. *Imidazolium Based Ionic Liquids for Enhanced Oil Recovery on the Carbonate Reservoir. 0.1 Mol Liq* 2022, 366, 120284; Kanj, M.; Sakthivel, S.; Velusamy, S.; Gardas, R. L.; Sangwai, J. S. *Adsorption of Aliphatic Ionic Liquids at Low Waxy Crude Oil-Water Interfaces and the Effect of Brine. Colloids Surf A Physicochem Eng Asp* 2015, 468, 62-75; Sakthivel. S.; Abdel-Azeim, S.; AlSaif; B.; Al-Abdrabalnabi, R. *Investigating the Role of [PF6]- and [BF4]-Based Ionic Liquids for Enhanced Oil Recovery in Carbonate Reservoirs: Experimental and Molecular Simulation Insights. J Mol Liq* 2023, 390, 123006; Sakthivel, S.; Velusamy, S.; Gardas, R. L.; Sangwai, J. S. *Use of Aromatic Ionic Liquids in the Reduction of Surface Phenomena of Crude Oil-Water System and Their Synergism with Brine. Ind Eng Chem Res* 2015, 54 (3), 968-978; Sakthivel, S.; Chhotaray, P. K.; Velusamy, S.; Gardas, R. L.; Sangwai, J. S. *Synergistic Effect of Lactam, Ammonium and Hydroxyl Ammonium Based Ionic Liquids with and without NaCl on the Surface Phenomena of Crude Oil/Water System. Fluid Phase Equilib* 2015, 398, 80-97; Sakihivel, S.; Velusamy, S.; Nair, V. C.; Sharma, T.; Sangwai, J. S. *Interfacial Tension of Crude Oil-Water System with Imidazolium and Lactam-*

*Based Ionic Liquids and their Evaluation for Enhanced Oil Recovery under High Saline Environment. Fuel* 2017, 191, 239-250; Velusamy, S.; Sakthivel, S.; Sangwai, J. S. *Effect of Imidazolium-Based Ionic Liquids on the Interfacial Tension of the Alkane-Water System and Its Influence on the Wetta-* *bility Alteration of Quartz under Saline Conditions through Contact Angle Measurements. Ind Eng Chem Res* 2017, 56 (46), 13521-13534; Sakthivel, S.; Gardas. R. L.; Sangwai, J. S. *Effect of Alkyl Ammonium Ionic Liquids on the Interfacial Tension of the Crude Oil-Water System and Their Use for the* *Enhanced Oil Recovery Using Ionic Liquid-Polymer Flooding. Energy & Fuels* 2016, 30 (3), 2514-2523; Sakthivel, S.; Elsayed, M. *Enhanced Oil Recovery by Spontaneous Imbibition of Imidazolium Based Ionic Liquids on the Carbonate Reservoir. J Mol Liq* 2021, 340, 117301, which are incorporated herein by reference in its entirety]. The functionalized IL $[C_{12}C_1COOHim]^+[Br]^-$ exhibited superior performance, reducing IFT to as low as 0.15 mN/m at 100 mM, while $[C_{12}C_2im]^+[Br]^-$ reduced IFT to 1.3 mN/m. This substantial IFT reduction is attributed to enhanced interactions between the IL molecules in the aqueous phase and the polar fractions of the oil. [See: Sakthivel, S.; Velusamy, S.; Gardas. R. L.; Sangwai, J. S. *Adsorption of Aliphatic Ionic Liquids at Low Waxy Crude Oil-Water Interfaces and the Effect of Brine. Colloids Surf A Physicochem Eng Asp* 2015, 468, 62-75; Sakthivel, S.; Abdel-Azeim, S.; AlSaif, B.; Al-Abdrabalnabi, R. *Investigating the Role of [PF6]- and [BF4]-Based Ionic Liquids for Enhanced Oil Recovery in Carbonate Reservoirs: Experimental and Molecular Simulation Insights. J Mol Liq* 2023, 390, 123006; Sakthivel, S.; Velusamy, S.; Gardas, R. L.; Sangwai, J. S. *Use of Aromatic Ionic Liquids in the Reduction of Surface Phenomena of Crude Oil-Water System and Their Synergism with Brine. Ind Eng Chem Res* 2015, 54 (3), 968-978; Sakthivel, S.; Chhotaray, P. K.; Velusamy, S.; Gardas, R. L.; Sangwai, J. S. *Synergistic Effect of Lactam, Ammonium and Hydroxyl Ammonium Based Ionic Liquids with and without NaCl on the Surface Phenomena of Crude Oil Water System. Fluid Phase Equilib* 2015, 398, 80-97, Sakthivel, S.; Velusamy, S.; Nair, V. C.; Sharma, T.; Sangwai, J. S. *Interfacial Tension of* *Crude Oil-Water System with Imidazolium and Lactam-Based Ionic Liquids and Their Evaluation for Enhanced Oil Recovery under High Saline Environment. Fuel* 2017, 191, 239-250, which are incorporated herein by reference in its entirety]. Both the SFT and IFT studies revealed the —COOH functionalized ILs was outperformed than the other one due to its stronger interactions at the interface. The earlier onset of IFT reduction and the earlier plateau at ~1 mM for $[C_{12}C_1COOHim]^+[Br]^-$, compared with the later plateau (10-12 mM) for $[C_{12}C_2im]^+[Br]^-$, further indicate that functionalization significantly enhances surface activity and aggregation behavior.

The IFT-700 tensiometer (Vinci Technologies; operational range up to 200° C. and 10,000 psi) was used to measure air-seawater and oil-seawater interfacial tensions and to quantify rock-oil-water contact angles. Interfacial tension measurements were conducted at different IL concentrations under ambient conditions (25° C., 1 atm) using the pendant drop method. The objective was to determine the critical micelle concentration (CMC) of the ILs. Air-water surface tension tests were performed first, followed by oil-seawater interfacial tension measurements as a function of IL concentration under reservoir conditions (100° C., 3000 psi). Based on these measurements, an optimal IL concentration of 50 mM (above CMC) was selected for subsequent wettability and oil recovery experiments. Additionally, dynamic interfacial tension tests of oil-water (ILs in SW) systems were performed at different IL concentrations to assess surfactant efficiency and provide kinetic insights into interfacial transport behavior over time. All experiments were conducted under ambient conditions (25° C., 14.7 psi).

Rock chips used for wettability studies were disc-shaped, 1 inch in diameter and 1/64 inch thick. The samples were polished with sandpaper (P400-P2000 grit), cleaned in a Soxhlet apparatus with methanol, and oven-dried at 100° C. for two days. Cleaned rock chips were vacuum-saturated with formation brine and aged for 2-3 days to achieve ionic equilibrium between the brine and the rock/pore surfaces. The samples were then desaturated with wet nitrogen gas in a capillary desaturator to reach irreducible water saturation $(S_{wi})$ and subsequently vacuum-saturated with crude oil. The rock slices were submerged in crude oil within sealed glass jars and aged in an oven at 100° C. for at least two weeks to restore reservoir-level oil-wet conditions [See: Kanj, M.; Sakthivel, S. Compositions and Methods Employing Carbon-Based Nanodots for Wettability Alteration, U.S. Pat. No. 11,702,583B2; Kanj, M.; Sakthivel, S.; Giannelis, E. *Wettability Alteration in Carbonate Reservoirs by Carbon Nanofluids. Colloids Surf A Physicochem Eng Asp* 2020, 598, 124819, which is incorporated herein by reference in its entirety].

The surfaces of oil-wet samples were then wiped and treated with various test fluids, including SW, 50 mM $[C_{12}C_2im]^+[Br]^-$ in SW, and 50 mM $[C_{12}C_1COOHim]^+$ $[Br]^-$ in SW, and aged under ambient conditions. Treatments were carried out for up to 30 days, with periodic sampling for static wettability testing. The IFT-700 tensiometer setup was used to measure both oil-water interfacial tension and rock-oil-water contact angles. The setup included a rock holder, a sapphire-glass visualization cell, an oil-dispensing syringe/needle, accumulators for base and test fluids, a thermostat for temperature control, a high-resolution camera, and computer-controlled software. Samples were mounted in the rock holder, submerged in the prefilled test fluid, and vacuumed. After equilibration (1-2 hours), an oil droplet was generated from the bottom of the cell and positioned beneath the rock surface using a needle. High-resolution images of the droplet were captured and analyzed using software to determine the contact angle.

Dynamic wettability tests were also conducted to simulate in-situ wettability changes in the reservoir during the substitution of native brine with injection fluids (ILs in SW). The experimental setup was similar to the static approach. The oil-wet core sample was first mounted in the rock holder and submerged in the base fluid (SW) for 1-2 hours to reach ionic equilibrium. An oil droplet was then generated and carefully placed beneath the rock surface. Subsequently, the base fluid (SW) was replaced with the test fluid (IL solution) using a syringe pump operating at a low flow rate (0.3 cc/min) to minimize turbulence that could disrupt the droplet. Highly surfactant systems can destabilize oil-water and rock-oil-water interfaces [See: Kanj, M.; Sakthivel, S.; Giannelis, E. *Wettability Alteration in Carbonate Reservoirs by Carbon Nanofluids. Colloids Surf A Physicochem Eng Asp* 2020, 598, 124819; Sakthivel, S. *Wettability Alteration of Carbonate Reservoirs Using Imidazolium-Based Ionic Liquids. ACS Omega* 2021, 6 (45), 30315-30326, which is incorporated herein by reference in its entirety]. To mitigate this, a separate syringe pump was used to generate the oil droplet, and the droplet volume was controlled at approximately 10-15 μL. A low IL concentration (0.25 mM) was selected to minimize droplet instability while maintaining reliable measurement conditions.

The static wettability of the rock-oil-seawater system was evaluated after aging and subsequent treatment of oil-wet samples with IL solutions for varying durations. FIG. 8, the IL-treated samples exhibited a marked transition in wettability from a strongly oil-wet state toward weakly or strongly water-wet conditions. Specifically, treatment with the carboxyl-functionalized IL, $[C_{12}C_1COOHim][Br]$, reduced the contact angle from 160° to 51.5°, while the non-functionalized IL, $[C_{12}C_2im][Br]$, decreased it to 75.9°. These results indicate that both ILs effectively shifted the wettability toward more favorable water-wet states, with the —COOH functionalized IL demonstrating superior performance. Consistent with the oil-water interfacial tension results, the wettability analysis further confirms that IL functionalization enhances surface activity, leading to stronger interactions with both the oil components and the rock surface.

The static wettability assessment of the rock-oil-seawater system after aging or treating the oil-wet samples in ILs solutions for different durations. As observed in FIG. 9B and FIG. 9C, the ILs-treated samples exhibited significant wettability changes from strongly oil-wet towards weakly water-wet or strongly water-wet states. Specifically, the ILs, $[C_{12}C_1COOHim]^+[Br]^-$, shifted the contact angle from 160° to 51.5°, while the ILs, $[C_{12}C_2im]^+[Br]^-$, dropped it to 75.9°. This indicates that both the ILs significantly shifted the wettability towards more favorable water-wet states. However, with the —COOH functionalized ILs was outperformed than the non-functionalized one (FIG. 9A). Similar to the oil-water interfacial results, the wettability study is also indicating that the functionalization of the ILs significantly increased their surface activity, and thus interacts much better with the oil fractions, as well into the rock surfaces.

As shown in FIG. 9A-FIG. 9C, the effects of temperature and pressure on static wettability—both with and without IL treatment—were also investigated over a broad range of conditions: 25-100° C. and 14.7-3000 psi. Increasing temperature and pressure led to a slight reduction in the contact angle, with the temperature effect being more pronounced than that of pressure. Specifically, temperature variations resulted in contact angle shifts of 4-6°, whereas pressure changes caused smaller shifts of about 2-3°. In general, increasing temperature in carbonate reservoirs exerts a beneficial influence, as it tends to alter the surface potential toward more negative or less positive values, thereby reducing oil-rock interactions through enhanced electrostatic repulsion between the rock surface and negatively charged oil components [See: Sakthivel, S.; Abdel-Azeim, S.; AlSaif B.; Al-Abdrabalnabi, R. *Investigating the Role of* [PF6]- *and* [BF4]-*Based Ionic Liquids for Enhanced Oil Recovery in Carbonate Reservoirs: Experimental and Molecular Simulation Insights. J Mol Liq* 2023, 390, 123006; Mahani, H.; Menezes, R.; Berg, S.; Fadili, A.; Nasralla, R.; Voskov, D.; Joekar-Niasar, V. *Insights into the Impact of Temperature on the Wettability Alteration by Low Salinity in Carbonate Rocks. Energy and Fuels* 2017, 31 (8), 7839-7853; Poston, S. W.; Ysrael, S.; Hossain, A. K. M. S.; Montgomery, E. F. *The Effect of Temperature on Irreducible Water Saturation and Relative Permeability of Unconsolidated Sands. Society of Petroleum Engineers Journal* 1970, 10 (02), 171-180; Tang, G. Q.; Morrow, N. R. *Salinity, Temperature, Oil Composition, and Oil Recovery by Waterflooding. SPE Reservoir Engineering* (*Society of Petroleum Engineers*) 1997, 12 (4), 269-276, which are incorporated herein by reference in its entirety]. Moreover, elevated temperatures also decrease oil-water interfacial tension and oil viscosity, which collectively enhance the relative permeability of the water phase within the rock matrix-ultimately contributing to improved oil recovery.

Subsequently, as shown in FIG. 10, dynamic interfacial tension (IFT) and wettability tests were conducted on oil-seawater and rock-oil-seawater systems with the addition of ILs at concentrations of 0.1 and 0.25 mM. The objective of this study was to elucidate the rate of IL transport from the bulk phase to the interface. All test fluids were prepared using seawater to simulate the injection brine typically employed in oilfield reservoirs. As illustrated in FIG. 10A, marked differences were observed between the two ILs. The acid-functionalized IL, $[C_{12}C_1COOHim][Br]$, exhibited a significantly faster and greater reduction in IFT, particularly at the higher concentration (0.25 mM), where equilibrium was achieved within 1 hour. At the lower concentration (0.1 mM), equilibrium was reached in approximately 3 hours. In contrast, the non-functionalized IL, $[C_{12}C_2im][Br]$, required a substantially longer time, reaching equilibrium only after about 10 hours at both concentrations. Notably, at the highest concentration of $[C_{12}C_1COOHim][Br]$, the oil droplet detached from the needle after approximately 17 hours, attributed to enhanced diffusion and surfactant activity at the interface, which accelerated the attainment of equilibrium.

Subsequently, as shown in FIG. 10B, dynamic wettability tests were performed by replacing the base fluid (seawater) with the injection fluid (ILs dissolved in seawater) to simulate chemical flooding in a depleted oil reservoir. This approach mimics a core flood or reservoir displacement setup and captures real-time wettability changes as the native brine is displaced by the injected chemicals. The results obtained from these dynamic experiments are representative of actual reservoir wettability alterations than those from static tests, in which samples are pre-treated with chemicals before placing the oil droplet on the rock surface. Static tests primarily characterize the wetting behavior and chemical affinity of ILs toward the oil-wet rock surface, whereas dynamic tests provide deeper insights into the progressive wettability modification occurring during active displacement.

In contrast, performing dynamic displacement of the base fluid with the test fluids induces interfacial imbalances at the oil-water and rock-oil-water interfaces, thereby promoting wettability alteration. This process enhances water capillarity, which shifts the system's wettability toward a more water-wet state. As shown in FIG. 10B, the sample initially exhibited a strongly oil-wet state when seawater was used as the base fluid. However, upon substituting the base fluid with ILs in seawater, the wettability gradually transitioned toward a water-wet state. The fluid substitution process was carried out for up to 6 hours, during which noticeable wettability shifts were observed even as the substitution progressed. These results indicate that convective flow of ILs around the oil droplet enhanced their transport to the interfaces. Furthermore, the continuous fluid flow mitigated near-interface concentration depletion, facilitating stronger interactions between the ILs and the oil phase.

The functionalized IL, $[C_{12}C_1COOHim][Br]$, proved more effective—reducing the contact angle from 149° to 74° and achieving equilibrium relatively faster, within approximately 20-30 hours. In comparison, the non-functionalized IL, $[C_{12}C_2im][Br]$, reduced the contact angle to a maximum of 95°, reaching equilibrium only after about 35 hours. These results are highly promising [See: Sakthivel, S. *Imidazolium Based Ionic Liquids for Enhanced Oil Recovery on the Carbonate Reservoir. J Mol Liq* 2022, 366, 120284; Sakthivel, S.; Abdel-Azeim, S.; AlSaif B.; Al-Abdrabalnabi, R. *Investigating the Role of [PF6]- and [BF4]-Based Ionic Liquids for Enhanced Oil Recovery in Carbonate Reservoirs: Experimental and Molecular Simulation Insights. J Mol Liq* 2023, 390, 123006; Sakthivel, S.; Velusamy, S.; Nair, V. C.; Sharma, T.; Sangwai, J. S. *Interfacial Tension of Crude Oil-Water System with Imidazolium and Lactam-Based Ionic Liquids and Their Evaluation for Enhanced Oil Recovery under High Saline Environment. Fuel* 2017, 191, 239-250, which are incorporated herein by reference in its entirety]. Similar to the dynamic IFT results, the surface affinity and interactions of ILs at the oil-water and rock-oil-water interfaces—along with their diffusivity and transport behavior—play crucial roles in these observations.

Five spontaneous imbibition experiments were conducted to evaluate the efficacy of the synthesized ILs. Indiana limestone outcrop core samples (2×1.5 in., length×diameter) were used, all prepared from the same sister rock to ensure uniformity. The cores were thoroughly cleaned in a Soxhlet extractor using successive washes of toluene and methanol to remove organic contaminants, followed by oven drying for at least 48 hours. The petrophysical properties—porosity and permeability—were measured using an Automated Helium Porosimeter and Permeameter (Model APP-608, Coretest Systems), operating on Boyle's law and the steady-state principle. The cores were then vacuum-saturated with high-salinity formation brine (TDS=241,000 ppm) to replicate reservoir conditions. Each brine-saturated sample was mounted in a conventional coreflood apparatus (Corelab, Tulsa, USA) equipped with a HAC-series Hassler-type core holder. Confining and back pressures were set to 4500 psi and 3200 psi, respectively. The cores were pre-flushed with 2-3 pore volumes (PV) of formation brine to determine brine permeability (kb). Subsequently, crude oil was injected to establish the initial oil saturation (Soi) and irreducible water saturation ($S_{wi}$), determined from the volume of displaced brine. The effective oil permeability was also recorded during oil flooding. To simulate reservoir wettability, the samples were aged by immersing them in crude oil within sealed glass jars and placing them in an oven at 100° C. for approximately two weeks to achieve an oil-wet state. The aged cores were then subjected to spontaneous imbibition tests in a high-temperature Amott cell (Vinci Technologies) filled with the respective test fluids and maintained at 100° C. Oil recovery was monitored by recording the volume of produced oil against the graduated marks on the cell. The Amott setup can operate up to 120° C. and 2 bar (30 psi) and has a capacity of approximately 20±0.1 cc.

FIG. 11 illustrates the effect of both the functionalized, $[C_{12}C_1COOHim]^+[Br]^-$ and non-functionalized $[C_{12}C_2im]^+$ $[Br]^-$ ILs for their spontaneous imbibition characteristics on the oil-wet carbonate reservoirs, along with their contribution to incremental oil recovery. Initially, a baseline experiment was performed using seawater (SW) as the test fluid. The seawater system yielded approximately 26% oil recovery, characterized by slow oil recovery kinetics. Oil displacement began only after 24 hours and reached a plateau after about 500 hours (~21 days). Subsequently, IL-based systems were evaluated at two concentrations—10 mM and 50 mM—representing lower and higher concentration regimes, both well above their respective CMCs. All test fluids were prepared in seawater to simulate oilfield injection brine, and experiments were conducted at an elevated temperature of 100° C. to represent reservoir conditions. Overall, the incorporation of ILs significantly enhanced oil recovery. At 10 mM, the oil recovery increased to 63% and 54% for the ILs, $[C_{12}C_1COOHim]^+[Br]^-$, and $[C_{12}C_2im]^+$ $[Br]^-$, respectively. At the higher concentration of ILs (50 mM), the recovery relatively increased to 70% and 62% for the ILs $[C_{12}C_1COOHim]^+[Br]^-$, and $[C_{12}C_2im]^+[Br]^-$, respectively.

Further, IL-containing systems exhibited an earlier onset of oil recovery (around 5-8 hrs), compared to 20-24 hrs with the neat seawater system. This effect was more pronounced for the functionalized IL and at higher concentrations, indicating faster interfacial interactions—particularly for $[C_{12}C_1COOHim]^+[Br]^-$, that facilitated early oil production, as reflected in the initial stages of the imbibition curves.

This indicates that the superior surfactancy of the functionalized ILs facilitated greater wettability shifts, and oil displacements. However, the IL-treated systems exhibit the recovery plateau only in the later stage of the curves, at approximately 650-750 hours, indicating sustained reactivity and diffusivity of ILs within the rock matrix. This prolonged interaction supports continuous wettability alteration and extended oil displacement. Among the studied ILs, the functionalized $[C_{12}C_1COOHim]^+[Br]^-$, reached its plateau earlier, consistent with trends observed in dynamic interfacial tension (IFT) and wettability studies. Overall, the addition of ILs contributed an incremental recovery of 28-44% of OOIP compared to seawater alone. However, increasing the IL concentration fivefold (from 10 to 50 mM) resulted in only a 7-8% additional recovery, indicating that oil recovery improvement plateaus beyond the CMC.

These results highlight the potential of functionalized ILs for enhancing oil recovery in deep carbonate reservoirs, owing to their superior stability, mobility, and deliverability under harsh conditions. The most efficient IL concentration was first optimized through CMC determinations, confirming that functionalized ILs such as, $[C_{12}C_1COOHim]^+[Br]^-$ are effective even at concentrations ten-fold lower than conventional chemical systems.

Contact angle experiments further demonstrated substantial wettability alteration—from strongly oil-wet (160°) to moderately water-wet (52-76°)—even under high temperature and salinity. Dynamic IFT and wettability measurements confirmed the interfacial activity of ILs at both oil-water and rock-oil interfaces, accelerating wettability shifts and promoting efficient oil displacement. These ionic liquids (ILs) were also evaluated in spontaneous imbibition tests on oil-wet carbonate reservoirs, where they yielded an additional 28-44% oil recovery even at very low concentrations. Notably, this enhanced recovery was achieved with IL concentrations approximately ten-fold lower than those typically required for conventional ILs or other oilfield chemicals. To further elucidate the interfacial mechanisms, molecular dynamics (MD) simulations were performed to investigate the behavior of functionalized $[C_{12}C_1COOHim]^+[Br]^-$ and unfunctionalized $[C_{12}C_2im]^+$ $[Br]^-$ ILs at the oil-brine, rock-oil interfaces, and in bulk brine.

At the oil-brine interface, the functionalized IL exhibited a higher packing density due to its ion-pair headgroup, which engages in strong electrostatic interactions with both aqueous-phase cations (e.g., $Na^+$) and anions (e.g., $Cl^-$). In contrast, the unfunctionalized IL lacked sufficient interfacial affinity to overcome bulk solvation forces, resulting in sparse interfacial adsorption. In calcite nanopore oil-displacement simulations, the functionalized IL demonstrated superior performance: its dual ability to interact with organic acids (via the cationic imidazolium moiety) and with calcite surfaces (through carboxylate-$Ca^{2+}$ bridging) enabled gradual and sustained oil displacement. Conversely, the unfunctionalized IL, which relied solely on ion-pair interactions with organic acids, produced rapid initial displacement but quickly plateaued. Simulations in bulk brine revealed comparable flow dynamics for both ILs, with diffusion coefficients below $0.2 \times 10^5$ cm$^2$/s, indicating minimal differences in bulk-phase mobility. Overall, these findings highlight that molecular functionalization significantly enhances interfacial activity, allowing ILs to effectively disrupt oil-calcite wettability and improve displacement efficiency in challenging carbonate reservoirs.

Numerous modifications and variations of the present disclosure are possible in light of the above teachings. It is therefore to be understood that within the scope of the appended claims, the invention may be practiced otherwise than as specifically described herein.

The invention claimed is:

1. A method of enhanced oil recovery, comprising:

injecting a solution comprising an imidazolium based ionic liquid and an aqueous liquid into an underground geological formation comprising crude oil and carbonate rock, wherein the imidazolium based ionic liquid is selected from the group consisting of 1-dodecyl-3-ethyl-imidazolium bromide and 1-dodecyl-3-(carboxymethyl)-imidazolium bromide, and wherein the aqueous liquid is at least one selected from a group consisting of water, a saline solution having a salinity of 1 to 300 kppm and a seawater having a salinity of 20 to 50 kppm;

flooding a portion of the underground geological formation with the solution at a temperature of 80 to 150° C. under a pressure of 1500 to 3000 psi to displace the crude oil from the carbonate rock; and extracting the crude oil from the underground geological formation.

2. The method of claim 1, wherein the imidazolium based ionic liquid comprises 1-dodecyl-3-(carboxymethyl)-imidazolium bromide which is obtained by a process comprising:

reacting bromoacetic acid with n-dodecyl imidazole at an elevated temperature to form 1-dodecyl-3-(carboxymethyl)-imidazolium bromide in the form of powder.

3. The method of claim 1, wherein the imidazolium based ionic liquid comprises 1-dodecyl-3-ethyl-imidazolium bromide which is obtained by a process comprising:

reacting 1-bromoethane with n-dodecyl imidazole at an elevated temperature to form 1-dodecyl-3-ethyl-imidazolium bromide in the form of powder.

4. The method of claim 1, wherein the imidazolium based ionic liquid is thermally stable having a weight loss of 1 to 5 wt. % at a temperature of 180 to 200° C. based on the total weight of the imidazolium based ionic liquid.

5. The method of claim 1, wherein the imidazolium based ionic liquid has a decomposition temperature of 250 to 300° C.

6. The method of claim 1, wherein the imidazolium based ionic liquid comprises 1-dodecyl-3-ethyl-imidazolium bromide having a critical micelle concentration of 10 to 15 mM.

7. The method of claim 1, wherein the imidazolium based ionic liquid comprises 1-dodecyl-3-(carboxymethyl)-imidazolium bromide having a critical micelle concentration of 1 to 5 mM.

8. The method of claim 1, wherein the solution comprises 1-dodecyl-3-ethyl-imidazolium bromide above critical micelle concentration and water, and the solution exhibits an air-water interfacial surface tension on the carbonate rock at a pressure of 10 to 30 psi of 30 to 40 mN/m at an ambient temperature and 1 to 6 mN/m at a temperature of 50 to 70° C.

9. The method of claim 1, wherein the solution comprises 1-dodecyl-3-(carboxymethyl)-imidazolium bromide above critical micelle concentration and water, and wherein the solution exhibits an air-water interfacial surface tension on the carbonate rock at a pressure of 10 to 30 psi of 25 to 40 mN/m at an ambient temperature and 1 to 6 mN/m at a temperature of 50 to 70° C.

10. The method of claim 1, wherein the solution comprises 1-dodecyl-3-ethyl-imidazolium bromide above critical micelle concentration and seawater, and wherein the solution exhibits an oil-seawater interfacial surface tension on the carbonated rock of 1 to 5 mN/m at an ambient temperature.

11. The method of claim 1, wherein the solution comprises 1-dodecyl-3-(carboxymethyl)-imidazolium bromide above critical micelle concentration and seawater, and wherein the solution exhibits an oil-seawater interfacial surface tension of 0.1 to 5 mN/m at an ambient temperature.

12. The method of claim 11, wherein the carbonate rock exhibits a rock-oil-seawater contact angle of 68° to 72° at a temperature of 70 to 100° C. and a pressure of 1500 to 3000 psi.

13. The method of claim 12, wherein the carbonate rock exhibits a contact angle between the carbonate rock, crude oil and seawater of 44° to 48° at a temperature of 70 to 100° C. and a pressure of 1500 to 3000 psi.

14. The method of claim 1, wherein the solution comprises 1-dodecyl-3-ethyl-imidazolium bromide at a concentration of 45 to 55 mM and seawater, and wherein a carbonate rock aged with the solution under ambient conditions for 30 to 40 days exhibits a rock-oil-seawater contact angle of 72° to 76° at a temperature of 20 to 50° C. and a pressure of 1500 to 3000 psi.

15. The method of claim 1, wherein the solution comprises 1-dodecyl-3-(carboxymethyl)-imidazolium bromide at a concentration of 45 to 55 mM and seawater, and wherein a carbonated rock aged with the solution under ambient conditions for 30 to 40 days exhibits a contact angle between the carbonate rock, crude oil and seawater of 48° to 52° at a temperature of 20 to 50° C. and a pressure of 1500 to 3000 psi.

16. The method of claim 1, wherein the solution comprises 1-dodecyl-3-ethyl-imidazolium bromide at a concentration of 0.1 to 0.3 mM and seawater, and an equilibrium oil-seawater interfacial surface tension is reached after 8 to 12 hours after contacting at a value of 12 to 17 mN/m.

17. The method of claim 1, wherein the solution comprises 1-dodecyl-3-(carboxymethyl)-imidazolium bromide at a concentration of 0.1 to 0.2 mM and seawater, and an equilibrium between the carbonated rock, crude oil and seawater on the interfacial surface tension is reached after 2 to 4 hours at a value of 10 to 12 mN/m.

18. The method of claim 1, wherein the solution comprises 1-dodecyl-3-(carboxymethyl)-imidazolium bromide at a concentration of 0.2 to 0.3 mM and seawater, and an equilibrium between the carbonated rock, crude oil and seawater on the interfacial surface tension is reached after 0.5 to 2 hours at a value of 5 to 7 mN/m.

19. The method of claim 1, having a cumulative oil recovery rate of 50% to 65% after a duration of 900 to 1200 hours, wherein the imidazolium based ionic liquid is at a concentration of 5 to 10 mM.

20. The method of claim 1, having an oil recovery rate of 60 to 80% after a duration of 900 to 1200 hours, wherein the imidazolium based ionic liquid is at a concentration of 40 to 60 mM.

\* \* \* \* \*